US009290664B2

(12) United States Patent
Cottrell et al.

(10) Patent No.: US 9,290,664 B2
(45) Date of Patent: Mar. 22, 2016

(54) TREATED AMMONIUM OCTAMOLYBDATE COMPOSITION AND METHODS OF PRODUCING THE SAME

(71) Applicant: Climax Engineered Materials, LLC, Phoenix, AZ (US)

(72) Inventors: David L. Cottrell, Fort Madison, IA (US); Evan K. Morey, Sahuarita, AZ (US)

(73) Assignee: Climax Engineered Materials, LLC, Phoenix, AZ (US)

( * ) Notice: Subject to any disclaimer, the term of this patent is extended or adjusted under 35 U.S.C. 154(b) by 0 days.

(21) Appl. No.: 14/530,993

(22) Filed: Nov. 3, 2014

(65) Prior Publication Data

US 2015/0148470 A1 May 28, 2015

Related U.S. Application Data

(60) Provisional application No. 61/907,856, filed on Nov. 22, 2013.

(51) Int. Cl.
| *C09D 11/50* | (2014.01) |
| *C09D 7/12* | (2006.01) |
| *C09C 1/00* | (2006.01) |
| *C08K 9/12* | (2006.01) |
| *C01G 39/02* | (2006.01) |

(Continued)

(52) U.S. Cl.
CPC ............... *C09C 1/0003* (2013.01); *C08K 9/12* (2013.01); *C09D 1/00* (2013.01); *C09D 5/033* (2013.01); *C09D 7/1225* (2013.01); *C09D 11/50* (2013.01); *C01P 2004/03* (2013.01); *C01P 2004/61* (2013.01); *Y10T 428/2982* (2015.01)

(58) Field of Classification Search
CPC .... C09D 11/50; C09D 7/1225; C09C 1/0003; C08K 9/12; C01G 39/02; C01P 2002/74; C01P 2004/03; B41M 5/32
USPC .......... 106/31.22, 31.64; 252/586; 430/270.1, 430/292
See application file for complete search history.

(56) References Cited

U.S. PATENT DOCUMENTS

| 3,899,284 A | 8/1975 | Stanley |
| 3,973,948 A | 8/1976 | Laferty, Jr. et al. |

(Continued)

FOREIGN PATENT DOCUMENTS

| CN | 102583542 A | 7/2012 |
| WO | WO 2004/043704 A1 * | 5/2004 |
| WO | 2009132198 A2 | 10/2009 |

OTHER PUBLICATIONS

PCT International Search Report and Written Opinion of the International Searching Authority, PCT/US2014/064093, Apr. 1, 2015 (11 pages).

*Primary Examiner* — Helene Klemanski
(74) *Attorney, Agent, or Firm* — Fennemore Craig, P.C.

(57) ABSTRACT

A treatment method includes the steps of: Providing an initial supply of an ammonium octamolybdate precursor powder having a bi-modal particle size distribution; applying a quantity of solvent to the initial supply of ammonium octamolybdate precursor powder to form a moistened intermediate powder; and allowing the moistened intermediate powder to adsorb the applied solvent over a time period, the quantity of solvent applied and the time period being sufficient to form a treated ammonium octamolybdate powder composition having a substantially uni-modal particle size distribution.

25 Claims, 18 Drawing Sheets

(51) Int. Cl.
  *B41M 5/32* (2006.01)
  *C09D 1/00* (2006.01)
  *C09D 5/03* (2006.01)

(56) References Cited

U.S. PATENT DOCUMENTS

| | | | |
|---|---|---|---|
| 4,762,700 A | 8/1988 | Huggins | |
| 5,985,236 A | 11/1999 | Khan et al. | |
| 6,793,907 B1 * | 9/2004 | Singh | C01G 39/00 423/53 |
| 7,276,102 B2 * | 10/2007 | Johnson, Jr. | B22F 1/0011 75/255 |
| 7,485,403 B2 | 2/2009 | Khan | |
| 7,524,353 B2 * | 4/2009 | Johnson, Jr. | B22F 1/0011 75/360 |
| 8,048,605 B2 | 11/2011 | Khan et al. | |
| 8,048,608 B2 * | 11/2011 | Jarvis | C09D 11/50 106/400 |
| 9,034,089 B2 * | 5/2015 | Jarvis | B41M 5/32 106/31.32 |
| 2003/0096048 A1 | 5/2003 | Tomiyama et al. | |
| 2006/0147842 A1 | 7/2006 | Khan | |
| 2006/0204395 A1 | 9/2006 | Johnson, Jr. | |
| 2010/0015558 A1 | 1/2010 | Jarvis et al. | |
| 2012/0107224 A1 | 5/2012 | Reed et al. | |

* cited by examiner

TREATED AMMONIUM OCTAMOLYBDATE COMPOSITION AND METHODS OF PRODUCING THE SAME

CROSS-REFERENCE TO RELATED APPLICATION

This application claims priority to U.S. provisional patent application Ser. No. 61/907,856, filed on Nov. 22, 2013, and entitled "Treated Ammonium Octamolybdate Composition and Methods of Producing the Same," which is hereby incorporated herein by reference for all that it discloses.

TECHNICAL FIELD

This invention relates to the production of ammonium octamolybdate compositions in general and more particularly to the production of ammonium octamolybdate powder compositions useful in the formulation of optically-markable inks and polymers.

BACKGROUND

Ammonium octamolybdate, $(NH_4)_4Mo_8O_{26}$ or "AOM," is a commercially-useful molybdenum composition and is available in a variety of phases or isomers. The chemical compound referred to as ammonium octamolybdate is also commonly known variously as "diammonium catena-tetramolybdate," "ammonium tetramolybdate," "tetrammonium hexamolybdate," or by CAS number 12411-64-2. Of particular interest herein is the α-phase or "α-AOM," although other phases are known and may be used in certain applications.

α-AOM is typically produced by the thermal decomposition of ammonium dimolybdate, $(NH_4)_2Mo_2O_7$ or "ADM." The thermal decomposition process occurs in accordance with the following basic chemical reaction:

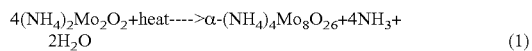

$$4(NH_4)_2Mo_2O_7 + \text{heat} \longrightarrow \alpha\text{-}(NH_4)_4Mo_8O_{26} + 4NH_3 + 2H_2O \quad (1)$$

Alternatively, α-AOM also may be produced by an aqueous, or wet process, such as that disclosed in U.S. Pat. No. 4,762,700, entitled "Ammonium Octamolybdate-Alpha," which is incorporated herein by reference for all that it discloses.

While α-AOM is commonly used as a smoke suppressant in various types of plastic materials, it may also be used in the formation of various types of optically-markable ink compositions. Such ink compositions change color in response to irradiation from light, typically from a laser, although other light sources may be used. The color change is the result of a change in oxidation state and/or the formation of non-stoichiometric products of the AOM constituent of the ink composition.

Several varieties of AOM-based optically-markable compositions or inks are disclosed in U.S. Pat. Nos. 7,485,403 and 8,048,605, both of which are entitled "Laser-Markable Compositions" and both of which are incorporated herein by reference for all that they disclose. Briefly, example ink compositions disclosed in the '403 and '605 patents comprise an oxyanion of a multivalent metal, a solvent, and a binder. The oxyanion of a multivalent metal may comprise AOM, and in particular α-AOM, although other materials are also identified. The solvent may comprise any of a wide range of solvents typically used for inks and lacquers, such as water, ethanol, ethyl acetate, isopropyl alcohol, and hydrocarbons. The binder is typically polymeric and may comprise acrylics, celluloses, polyvinyl alcohol, polyesters, and the like. The binder may further include a labile group, such as hydroxyl, acetoxy, ether acetal, or halogen. The disclosed ink compositions may also include a number of additional additives and compositions depending on a wide range of factors and desired ink characteristics, as also described in the patents.

Generally speaking, the various inks or optically-markable compositions are formed by mixing together the appropriate quantities of the AOM, solvent, and binder materials to form a lacquer. The lacquer may then be applied to the material to be marked (e.g., paper or cardboard) and allowed to dry. The actual marking or image formation process may be accomplished by directing a light (e.g., a laser beam) of suitable wavelength onto the applied ink, whereupon the color of the ink changes, thereby forming the desired image.

In addition to inks, the referenced patents also teach that AOM also may be incorporated directly into various types of polymers, such as nylon, polyesters, polyamide, polycarbonate, polyacrylate, polymethacrylate, ABS polymers, polyolefins and the like, which may thereafter be directly marked as desired in a process similar to that used for inks.

SUMMARY OF THE INVENTION

A treatment method may include the steps of: Providing an initial supply of an ammonium octamolybdate precursor powder having a bi-modal particle size distribution; applying a quantity of solvent to the initial supply of ammonium octamolybdate precursor powder to form a moistened intermediate powder; and allowing the moistened intermediate powder to adsorb the applied solvent over a time period, the quantity of solvent applied and the time period being sufficient to form a treated ammonium octamolybdate powder composition having a substantially uni-modal particle size distribution.

Also disclosed is an ammonium octamolybdate composition made by adding an amount of water to an initial supply of ammonium octamolybdate precursor powder having a bi-modal particle size distribution and by allowing the initial supply of ammonium octamolybdate powder to adsorb the added water over a time period, the amount of water added and time period being sufficient to produce the treated ammonium octamolybdate powder composition, the treated ammonium octamolybdate powder composition having a uni-modal particle size distribution.

An improved optically-markable ink composition of the type comprising an oxyanion of a multivalent metal, a solvent, and a binder is also disclosed wherein the improvement includes using as the oxyanion of a multivalent metal an ammonium octamolybdate powder having a substantially uni-modal particle size distribution made by applying an amount solvent to an initial supply of ammonium octamolybdate precursor powder to form a moistened intermediate powder and allowing the moistened intermediate powder to adsorb the applied solvent over a time period, the amount of solvent applied and time period being sufficient to form the treated ammonium octamolybdate powder composition having the substantially uni-modal particle size distribution.

In another embodiment, a treatment method may include: Providing an initial supply of an ammonium octamolybdate precursor powder having a bi-modal particle size distribution; providing an intermediate adsorbent; applying a quantity of solvent to the intermediate adsorbent to produce a solvent-laden intermediate adsorbent; placing the solvent-laden intermediate adsorbent and the initial supply of ammonium octamolybdate precursor powder into a container; sealing the container; and allowing the initial supply of ammonium octamolybdate precursor powder to adsorb solvent desorbed from the intermediate adsorbent over a time period, the quantity of solvent and the time period being sufficient to form a treated ammonium octamolybdate powder composition having a substantially uni-modal particle size distribution.

Still yet another embodiment of a treatment method may include: Providing an initial supply of an ammonium octamolybdate precursor powder having a bi-modal particle size distribution and having retained moisture of at least about 0.1 wt. %, as determined by loss-on-drying; placing the initial supply of ammonium octamolybdate precursor powder into a container; sealing the container; and heating the sealed container to a temperature of at least about 30° C. for a time period sufficient to form a treated ammonium octamolybdate powder composition having a substantially uni-modal particle size distribution.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
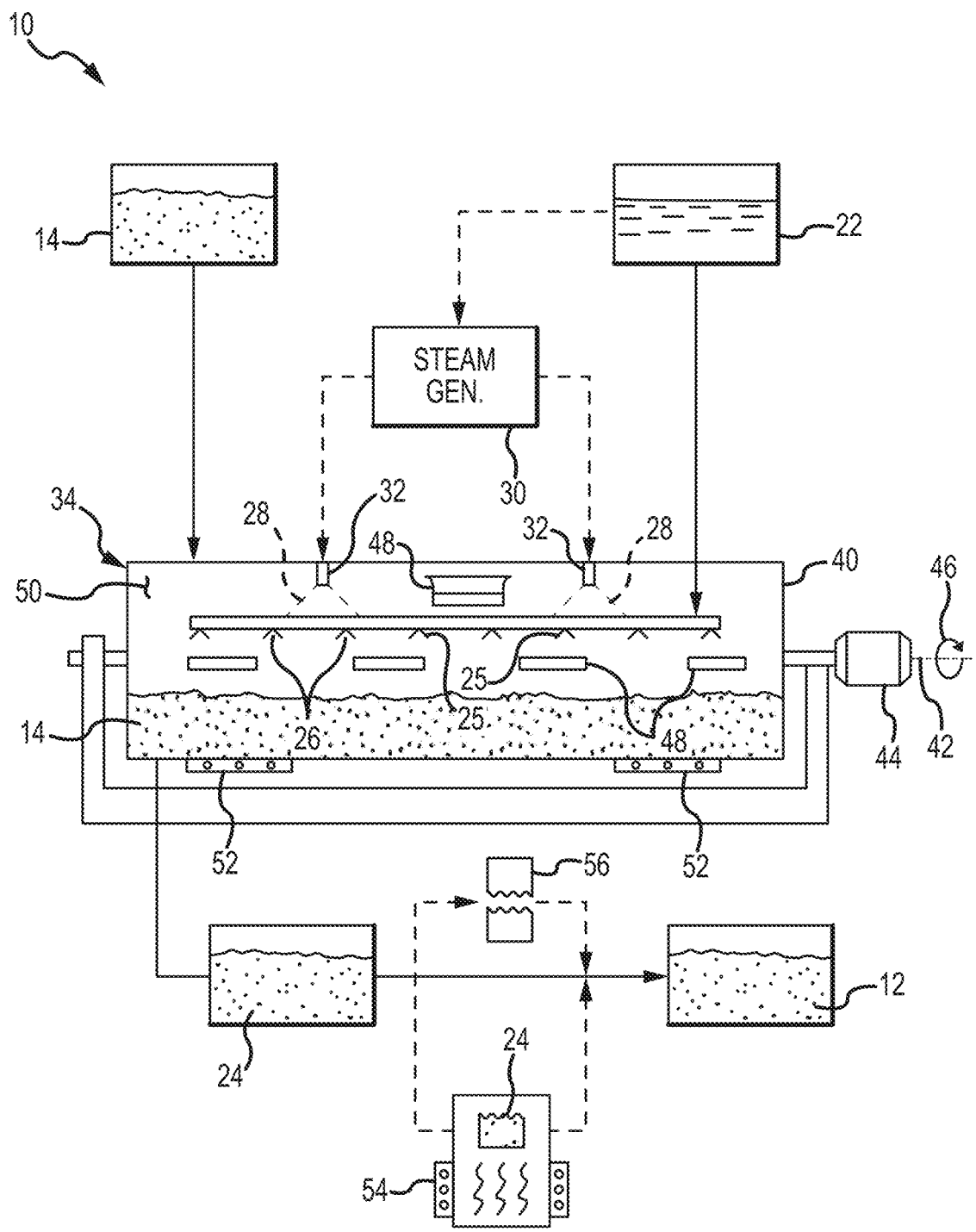
FIG. 1 is a schematic representation of basic process steps in one embodiment of a method of producing a treated ammonium octamolybdate composition.
Figure 2:
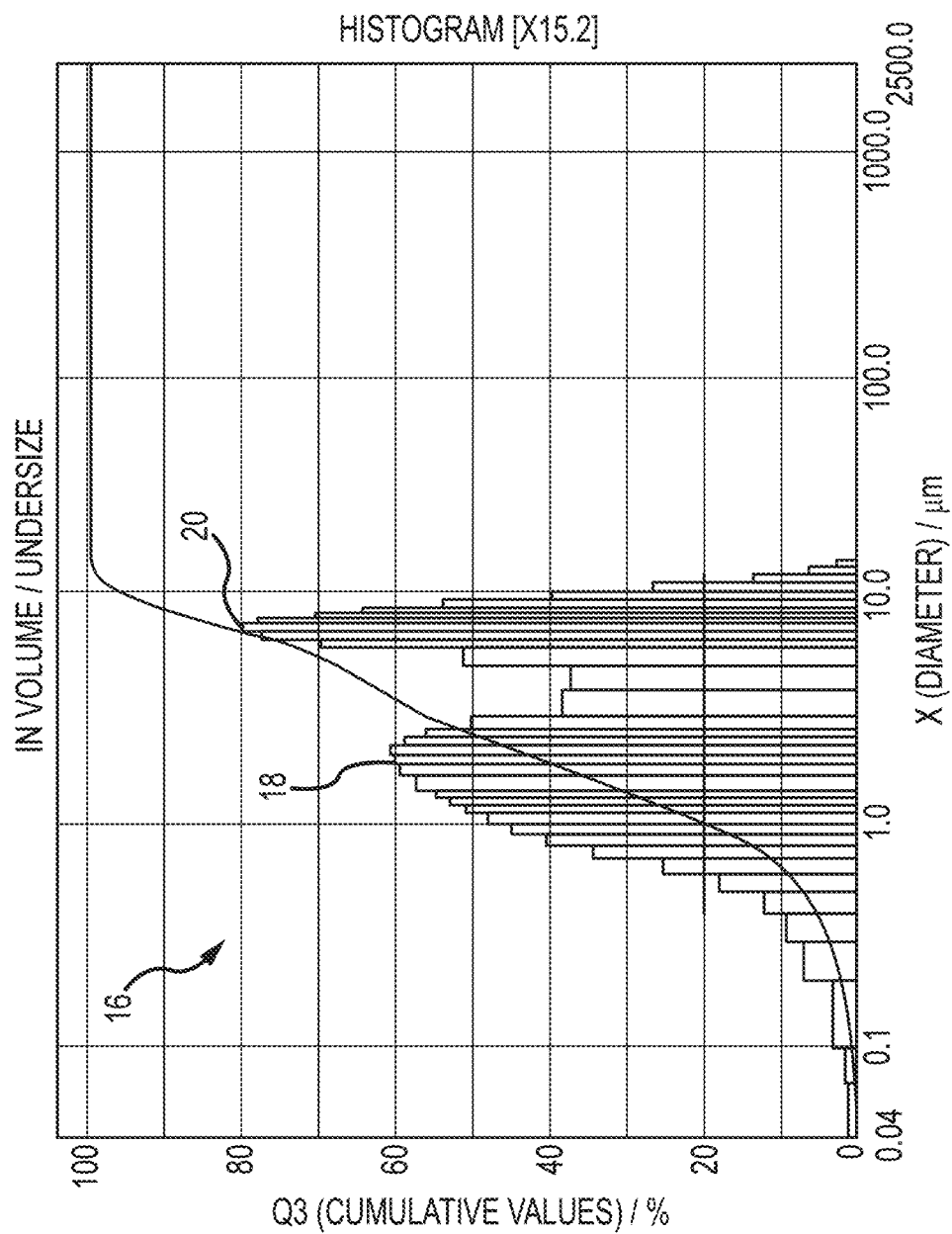
FIG. 2 is a particle size histogram and plot of cumulative undersize distribution of a typical commercially-available standard ammonium octamolybdate precursor material having a bi-modal particle size distribution.

Various embodiments of a method 10 of producing a treated ammonium octamolybdate composition 12 are shown in FIG. 1 and may involve providing an initial supply of an ammonium octamolybdate (AOM) precursor powder 14. In a typical embodiment, the ammonium octamolybdate precursor powder 14 may comprise an α-AOM powder produced by the thermal decomposition of ADM. The α-AOM precursor powder 14 may comprise a substantially bi-modal particle size distribution 16, with two modal peaks 18 and 20, as best seen in FIG. 2. A solvent 22, such as water, may then be applied to the initial supply of ammonium octamolybdate precursor powder 14 to form a moistened intermediate powder composition 24.

As will be described in much greater detail herein, the solvent 22 may be added or applied to the initial supply of AOM precursor powder 14 in liquid or vapor (i.e., gas) form and in a variety of ways to form the moistened intermediate powder composition 24. For example, in one embodiment, the solvent 22 may be added to the AOM precursor powder 14 in liquid form (e.g., as an atomized stream 25 produced by one or more atomizing nozzles 26) to evenly distribute the solvent 22 throughout the AOM precursor powder 14. In an alternate embodiment, the solvent 22 may be first vaporized, i.e., converted to steam 28 (in an embodiment where the solvent 22 is water), by steam generator apparatus 30. The steam 28 may then be applied to the AOM precursor powder 14 (e.g., via one or more steam ports 32) to form the moistened intermediate powder composition 24.

In some embodiments, it may be desirable to tumble or otherwise agitate the initial supply of AOM precursor powder 14 during the moistening process to promote the more uniform application of the solvent 22 (i.e., in liquid form or as a vapor) to the AOM precursor powder 14. In one embodiment, a drum-type tumbler apparatus 34 may be used to turn over or tumble the AOM precursor powder 14 while the solvent 22 is being applied. Alternatively, other arrangements are possible, as will be described in further detail herein.

As mentioned, the application of the solvent 22 (i.e., in liquid or vapor form) to the initial supply of AOM precursor powder 14 results in the formation of the moistened intermediate powder composition 24. The moistened intermediate powder composition 24 is then allowed to adsorb the applied solvent 22 for a time sufficient to produce the treated AOM composition 12. During the adsorption process, certain physical characteristics of the AOM precursor powder 14 are significantly altered. For example, during the solvent adsorption process the particle size distribution of the AOM precursor powder 14 is changed or transformed from the substantially bi-modal distribution 16 having two modal peaks 18 and 20 (FIG. 2) to a substantially uni-modal distribution 36 having a single modal peak 38. See FIG. 3.

In addition to the change or transformation of the particle size distribution characteristic, it is believed that the treatment process 10 of the present invention also results in a change in the surface morphology or texture of the individual particles of the treated AOM composition 12. For example, and with reference now primarily to FIGS. 4 and 5, scanning electron micrographs of the untreated AOM precursor powder 14 (FIG. 4) and the treated AOM composition 12 (FIG. 5) suggest that some change in the surface texture of the individual particles has occurred. It is currently believed that the change in surface texture may have some impact on the improved performance of the treated AOM composition 12 of the present invention when used in the formation of optically-markable inks and polymers.

With reference back now primarily to FIG. 1, the moistened intermediate product 24 may be further treated, if desired, before being considered to be the final, treated AOM composition 12. For example, the moistened intermediate product 24 may be further heated and/or dried in an oven or dryer 54 to further reduce the level of any residual moisture that may be contained in the intermediate product 24. The intermediate product 24 may also be subjected to an additional grinding or comminution step 56 to break up any larger agglomerations that may have formed during the treatment process. The grinding or comminution step 56 may be performed on either the untreated intermediate product 24 or on a dried intermediate product from dryer 54.

Thereafter, the final, treated AOM composition 12 may be used in the production of AOM-based optically-markable ink and polymer compositions. The treated AOM composition 12 may be used to replace all or a portion of the conventional AOM required by the particular formulation to improve the performance of the ink and/or polymer compositions.

A significant advantage of the treatment method of the present invention is that it results in the production of a treated AOM composition 12 that exhibits improved performance when used in the production of AOM-based optically-markable inks and polymers.

For example, the treated AOM composition 12 of the present invention provides improved viscosity performance of ink lacquer compositions made from the treated AOM composition 12. More specifically, use of the treated AOM composition 12 results in ink lacquers or compositions having generally lower viscosities than are typically achievable with conventional AOM compositions. The lower viscosities of ink compositions made with the treated AOM compositions 12 of the present invention are significant in that the lower viscosities dispense with the need to add additional liquids or other viscosity modifiers during the ink mixing stage, which may adversely affect the performance of the dried inks. In addition, the use of the treated AOM composition 12 also provides for improved performance of the resulting ink compositions after the optical marking process. Such improved performance includes, but is not limited to, perceived color (i.e., "whiteness") and optical density characteristics.

Still further, the ability to easily and readily transform or convert the particle size distribution from bi-modal 16 to uni-modal 36 by means of the treatment process described herein is also advantageous in that it is difficult to achieve the desired uni-modal distribution by conventional means (e.g., by comminution and/or classification processes). For example, it is generally preferred that the ammonium octamolybdate compositions used in optically-markable inks comprise the alpha form (i.e., $\alpha$-AOM) made by the thermal decomposition of ammonium dimolybdate (ADM), as noted above. Thermally decomposed $\alpha$-AOM typically exhibits a bi-modal particle size distribution 16 having two modal peaks 18 and 20, as best seen in FIG. 2. Further, those modal peaks usually occur at particle sizes of roughly 1 μm and 10 μm. Particle sizes of 1 μm are extremely small, typically on the order of particles contained in cigarette smoke, and cannot be easily removed or separated from the larger sizes. While the 10 μm particles can be more easily reduced in size by various types of grinding or milling processes, the small size of even the 10 μm particles make such grinding or milling processes impractical for most applications. Further complicating the comminution or classification processes is that $\alpha$-AOM powders usually are not flowable, which creates difficulties in the handling of the powders for such processes.

Also significantly, preliminary testing indicates that the uni-modal particle size distribution 36 (FIG. 3) of the treated AOM composition 12 of the present invention may not be the sole factor leading to the improved performance of optically-markable ink compositions 12 of the present invention. For example, conventional AOM materials that have been additionally processed and classified to attain a substantially uni-modal particle size distribution have not resulted in optically-markable inks having the improved performance of the treated AOM compositions 12 of the present invention. That is, significant differences remain between treated and untreated AOM compositions, even where the latter have been further processed so as to achieve a uni-modal or nearly uni-modal particle size distribution of the treated AOM compositions 12.

As was briefly described earlier, it is currently believed that the improved performance of the treated AOM compositions 12 of the present invention (compared with untreated AOM) also may be due in part to a morphological change in the texture of the individual particles of the treated AOM composition 12. See FIGS. 4 and 5. While the specific structural basis for the improved performance of treated AOM 12 is not entirely understood at this time, a number of process steps are considered to be of primary importance in achieving these advantages, as identified herein.

Still another significant aspect of the treated AOM composition 12 of the present invention is that the treated AOM composition 12 exhibits substantially the same anhydrous loss-on-ignition value ("an-LOI") as untreated AOM compositions. The an-LOI value is an important parameter in the formulation of optically-markable ink compositions. The ability to maintain approximately the same an-LOI value in the treated AOM compositions 12 of the present invention represents yet an additional advantage of the treated AOM compositions 12 of the present invention.

Having briefly described various embodiments for making or producing treated AOM powder compositions 12 of the present invention, as well as some of the more significant attributes and advantages of the treated AOM compositions 12 as they relate to the production of optically-markable inks and polymers, various preferred embodiments of methods of producing treated AOM compositions 12 will now be described in detail. However, before proceeding with the description it should be noted that neither the following description nor the claimed process should be regarded as restricted to any particular operational parameters, including reagent quantities, the order of reagent addition, reaction conditions, and other numerical values, unless otherwise indicated. Still further, it should be noted that specific reaction parameters and other operational factors may be optimized in a given situation (taking into account environmental factors, production-scale requirements, and the like) using routine preliminary pilot testing. The discussion provided herein involves one or more preferred embodiments which are designed to provide optimum results and shall not be considered limiting or restrictive.

Referring back now primarily to FIGS. 1 and 2, a method 10 of producing a treated ammonium octamolybdate composition 12 may comprise providing an initial supply of an ammonium octamolybdate (AOM) precursor material 14. As mentioned earlier, the chemical compound referred to as ammonium octamolybdate is also commonly known variously as "diammonium catena-tetramolybdate," "ammonium tetramolybdate," "tetrammonium hexamolybdate," or by CAS number 12411-64-2. Consequently, as used herein, the term "AOM" should be regarded as including compounds known variously by these other names. On one embodiment, the AOM precursor material 14 comprises an alpha-phase ammonium octamolybdate ($\alpha$-AOM) powder material produced by the thermal decomposition of ammonium dimolybdate (ADM), as noted herein. Thermally decomposed $\alpha$-AOM is readily commercially available from a number of vendor sources. By way of example, in the various embodiments and examples shown and described herein, the AOM precursor powder material 14 comprises a thermally-decomposed $\alpha$-AOM powder material produced by the Climax Molybdenum Company, Ft. Madison, Iowa (US) operations.

The $\alpha$-AOM precursor powder material 14 produced by the Climax Molybdenum Company comprises a fine powder having a bi-modal particle size distribution 16 having two modal peaks 18 and 20, as best seen in FIG. 2. Before proceeding with the description, it should be noted that as used herein the term "bi-modal" refers to a particle size distribution that comprises two modal peaks that appear as local maxima in a differential plot or graph of particle size or in a histogram plot or graph of discrete particle sizes. Similarly, the term "uni-modal" refers to a particle size distribution that comprises a single modal peak or maximum value that appears in a differential plot of particle size or in a histogram plot of discrete particle sizes. In addition, it should be noted that the particle size distribution plots shown and described herein were produced by one of two different types of liquid dispersion type laser particle size analyzers, as specifically identified in the Examples section. The first type of analyzer was a Cilas particle size analyzer, model no. 1180, manufactured by Compagnie Industrielle des Lasers (Cilas), of Orleans, France. The second type of analyzer was a Microtrac particle size analyzer, model no. 53000/53500, manufactured by Microtrac, Inc., of Montgomeryville, Pa. (US).

Figure 4:
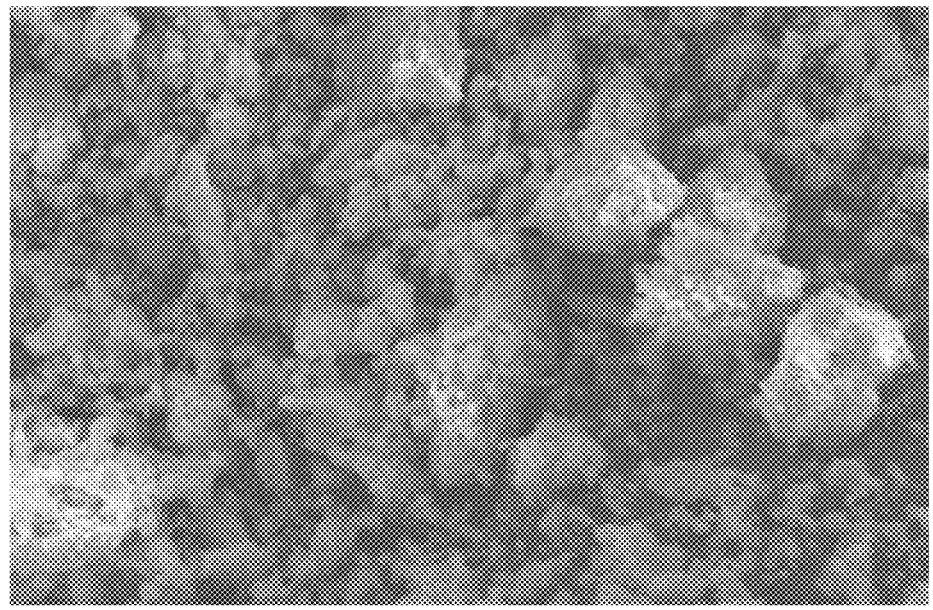
FIG. 4 is a scanning electron micrograph at 2000× magnification of a typical ammonium octamolybdate precursor material.
Figure 5:
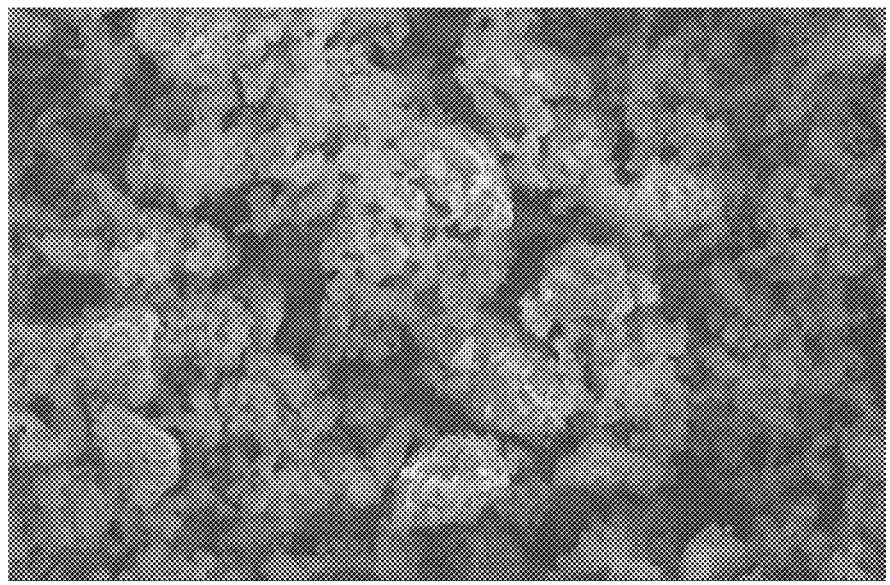
FIG. 5 is a scanning electron micrograph at 2000× magnification of a treated ammonium octamolybdate powder composition.

Continuing now with the description, the bi-modal particle size distribution 16 of the $\alpha$-AOM precursor material 14 utilized herein comprises a first modal peak 18 at particle sizes ranging from about 1-4 $\mu$m (typically about 2 $\mu$m) and a second modal peak 20 at particle sizes ranging from about 6-10 $\mu$m (typically about 8 $\mu$m). A scanning electron micrograph of the $\alpha$-AOM precursor powder material 14 is depicted in FIG. 4.

After providing a suitable quantity of the AOM precursor material 14, a solvent 22 may then be applied to the initial supply of precursor material 14 to form or produce a moistened intermediate product 24. In one embodiment, the solvent 22 may comprise deionized water and may be added in an amount sufficient to produce a treated AOM composition having the desired uni-modal particle size distribution. Alternatively, other types of solvents 22, such as various alcohols and hydrocarbons, may also be used. In embodiments where solvent 22 comprises deionized water, deionized water applied in a range of about 0.1% by weight to about 1% by weight, preferably in a range of about 0.25% by weight to about 0.5% by weight, and more preferably in an amount of about 0.5% by weight, of the initial supply of the precursor material 14 will be sufficient for this purpose.

The solvent 22 may be applied in liquid form or as a gas or vapor (e.g., steam 28). It is currently believed that the application of solvent 22 to the AOM precursor material 14 (i.e., either in liquid or vapor form) causes the smaller particles to bond together or agglomerate via a capillary condensation mechanism. The action of capillary condensation is a result of the hydrophilic character of the AOM precursor material 14 and the relationship between the high surface area and low gas volume at interparticle sites. The amount of moisture that can condense is dependent on the angle formed between the surfaces of two particles and the amount of moisture available. Once sufficient moisture is present (i.e., in the form of liquid or vapor), the solvent will solubilize in the material. AOM has a solubility limit in water of about 4 grams per liter (g/l) at 25° C. and should increase with temperature. When exposed to moisture, then, small "bridges" of AOM will form between the particles, binding them together with sufficient strength to hold them together after drying.

We have found that the addition of water in an amount of about 0.5% by weight provides sufficient agglomeration of the smaller particles to convert the bi-modal particle size distribution 16 (FIG. 2) of the $\alpha$-AOM precursor powder 14 to a uni-modal particle size distribution 36 (FIG. 3) without significantly increasing the anhydrous loss-on-ignition ("an-LOI") value of the resulting treated AOM composition 12. By way of example, the treated $\alpha$-AOM compositions of the present invention may comprise an-LOI values ranging from about 8% to about 8.8%. However, the addition of the solvent 22 may nominally increase the loss-on-drying (LOD) value of the resulting treated AOM composition 12.

As described earlier, the solvent 22 may be applied to the AOM precursor material 14 in any of a variety of ways. In one embodiment, the solvent 22 (e.g., water) may be added or applied to the initial supply of AOM precursor material 14 in liquid form by injecting it through one or more atomizing nozzles 26 positioned adjacent the AOM precursor material 14, as best seen in FIG. 1. The atomizing nozzles 26 break-up the liquid solvent 22 (e.g., water) into fine droplets, forming atomized streams 25. The dispersion of the liquid water into one or more atomized streams 25 promotes the more even distribution of the liquid water (i.e., in the form of atomized droplets) over the AOM precursor material 14.

Depending on the manner in which the AOM precursor material 14 is presented for treatment, i.e., whether the AOM precursor material 14 is spread out in a thin bed of material or whether it is provided in a bulk form comprising a thicker bed of material, it may be desirable or advantageous to agitate or tumble the AOM precursor material 14 during the solvent application process to ensure a more uniform application of the solvent 22 throughout the bulk of the precursor powder 14. In one embodiment, such agitation or tumbling may be effected by placing the AOM precursor powder 14 in a drum-type tumbler apparatus 34.

By way of example, tumbler apparatus 34 may comprise a generally elongated cylindrical chamber or drum 40 mounted for rotation about an axis 42. A drive motor 44 operatively associated with the drum 40 may be operated to rotate drum 40 about axis 42, generally in the direction indicated by arrow 46. One or more blade or paddle members 48 provided on the inside surface 50 of drum 40 lift and tumble the AOM precursor powder 14 as drum 40 rotates, thereby causing new particles of the precursor powder 14 to be exposed to the atomized solvent 22 being discharged from the nozzles 26.

In another embodiment, the solvent 22 may be applied to the AOM precursor material 14 by first vaporizing the solvent 22, i.e., by converting it to steam 28. A suitable steam generator apparatus 30 may be used for this purpose. The steam 28 may then be applied to the AOM precursor powder 14 via one or more steam ports 32 positioned adjacent the precursor material 14. In one embodiment, the steam ports 32 may be positioned within tumbler apparatus 34 to ensure the more even exposure of the precursor material 14 to the steam 28.

In some embodiments, it may be desirable to heat the precursor material 14 during the solvent application process. If so, tumbler apparatus 34 may also be provided with one or more heating units 52. The heating units 52 may be activated to provide the desired amount of heating and at the desired times during the solvent application process. For example, in one embodiment, the heating and application of steam may be applied together or in an alternating manner to produce the treated AOM composition 12. If heating is desired, temperatures in the range of about 80° C. to about 105° C. (more preferably about 100° C.) may be used.

Figure 3:
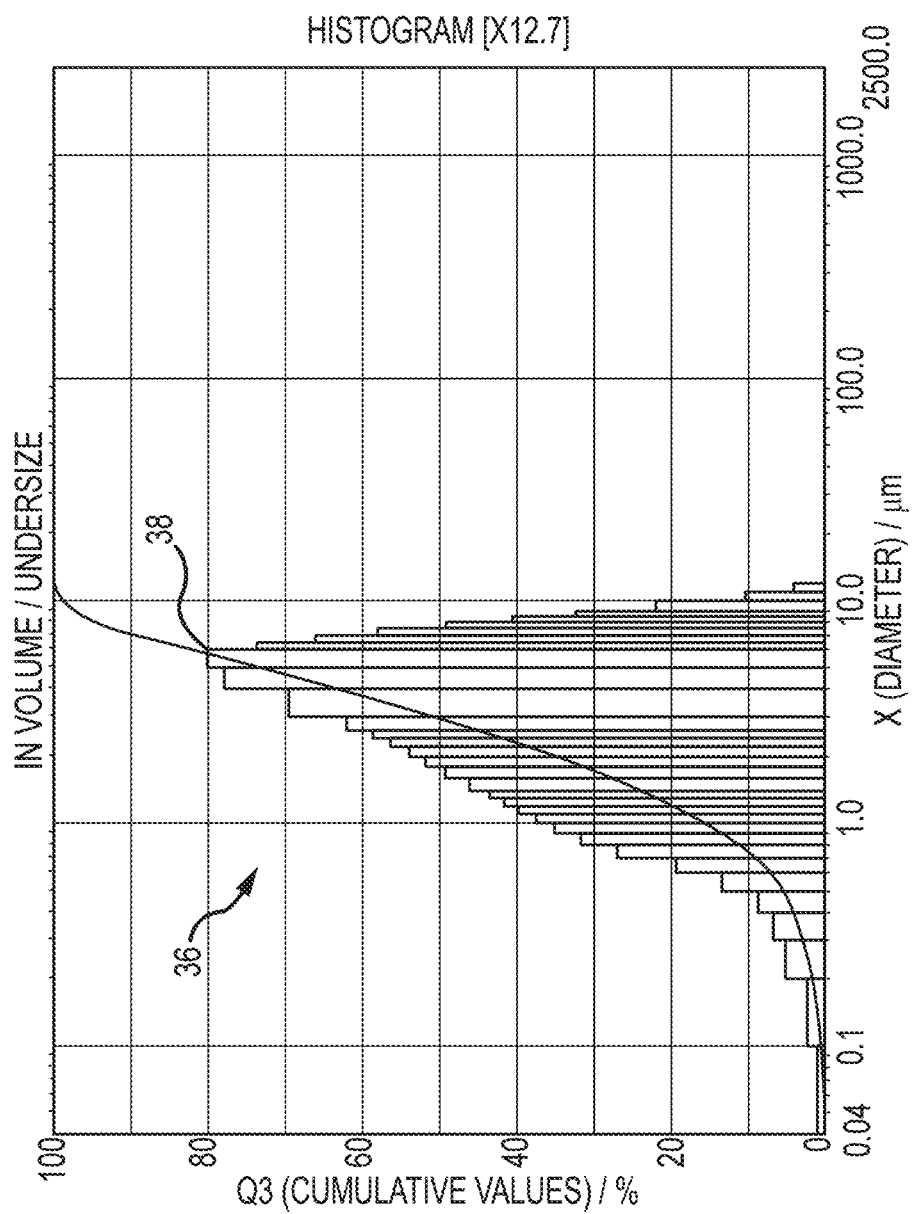
FIG. 3 is a particle size histogram and plot of cumulative undersize distribution of a treated ammonium octamolybdate powder composition having a uni-modal particle size distribution.

The application of the solvent 22 to the initial supply of AOM precursor powder 14 results in the formation of the moistened intermediate powder composition 24. The moistened intermediate powder composition 24 is then allowed to adsorb the applied solvent 22 for a time sufficient to produce the treated AOM composition 12 in the manner described earlier. Generally speaking, time periods of at least about 12 hours, and more preferably from about 48 hours to about 96 hours, will be sufficient for this purpose. During the solvent adsorption process, certain physical characteristics of the AOM precursor powder are significantly altered. For example, as the solvent is adsorbed by the AOM precursor powder 14, the particle size distribution of the AOM precursor powder 14 is changed or altered from the substantially bi-modal distribution 16 having two modal peaks 18 and 20 (FIG. 2) to a substantially uni-modal distribution 36 having a single modal peak 38 (FIG. 3). Generally speaking, the treated AOM composition 12 will have a single modal peak 38 at diameters ranging from about 4 μm to about 12 μm, preferably ranging from about 6 μm to about 10 μm, and more preferably at a diameter of about 8 μm. We have found that the uni-modal particle size distribution is of greater importance than the particular position of the unimodal peak. For example, samples having uni-modal peaks ranging from about 6 μm to about 10 μm have all provided the noted performance improvements.

In addition to the change or transformation of the particle size distribution characteristic (i.e., from substantially bi-modal 16 to substantially uni-modal 36), it is believed that the treatment process 10 also results in a change in the surface morphology or texture of the individual particles of the treated AOM composition 12. For example, and with reference now primarily to FIGS. 4 and 5, scanning electron micrographs of the untreated AOM precursor powder 14 (FIG. 4) and the treated AOM composition 12 (FIG. 5) suggest that some change in the surface texture of the individual particles has occurred. It is currently believed that the change in surface texture may have some impact on the improved performance of the treated AOM composition 12 when used in the formation of optically-markable inks and polymers.

As mentioned earlier, the method 10 may optionally involve additional treatment steps to the moistened intermediate material 24. For example, the moistened intermediate product 24 may be further heated and/or dried in an oven or dryer 54. Such additional heating may further reduce the level of any residual moisture that may be contained in the intermediate product 24 and may also be used to reduce the loss-on-drying (LOD) specification of the treated AOM composition 12. If used, such heating may be conducted at any of a wide range of temperatures sufficient to liberate the moisture, such as, for examples, temperatures ranging from about 80° C. to about 100° C. when water is used as solvent 22.

In addition, the intermediate product 24 may also be subjected to an additional grinding or comminution step 56, either with our without an additional heating step 54, in order to break up any larger agglomerations that may have formed during the treatment process.

In this regard it should be noted that certain changes in the particular processing steps and processing parameters of method 10 may be used to change or alter certain characteristics in the treated AOM composition 12, as may be required or desired in certain applications. For example, using steam 28 instead of atomized water during the solvent application process typically results in a treated AOM composition 12 having somewhat smaller maximum particle sizes. The use of steam 28 may also reduce the particle size associated with the second modal peak 20 of the treated material 12. Further, the application of heat, while not required to produce the treated AOM composition 12, may reduce the time period required to produce the treated AOM composition 12. The application of heat, either during the solvent application process or to the moistened intermediate product 24 formed thereby may also reduce the loss-on-drying (LOD) specification of the final treated AOM composition 12, and may be desirable in certain applications.

Figure 19:
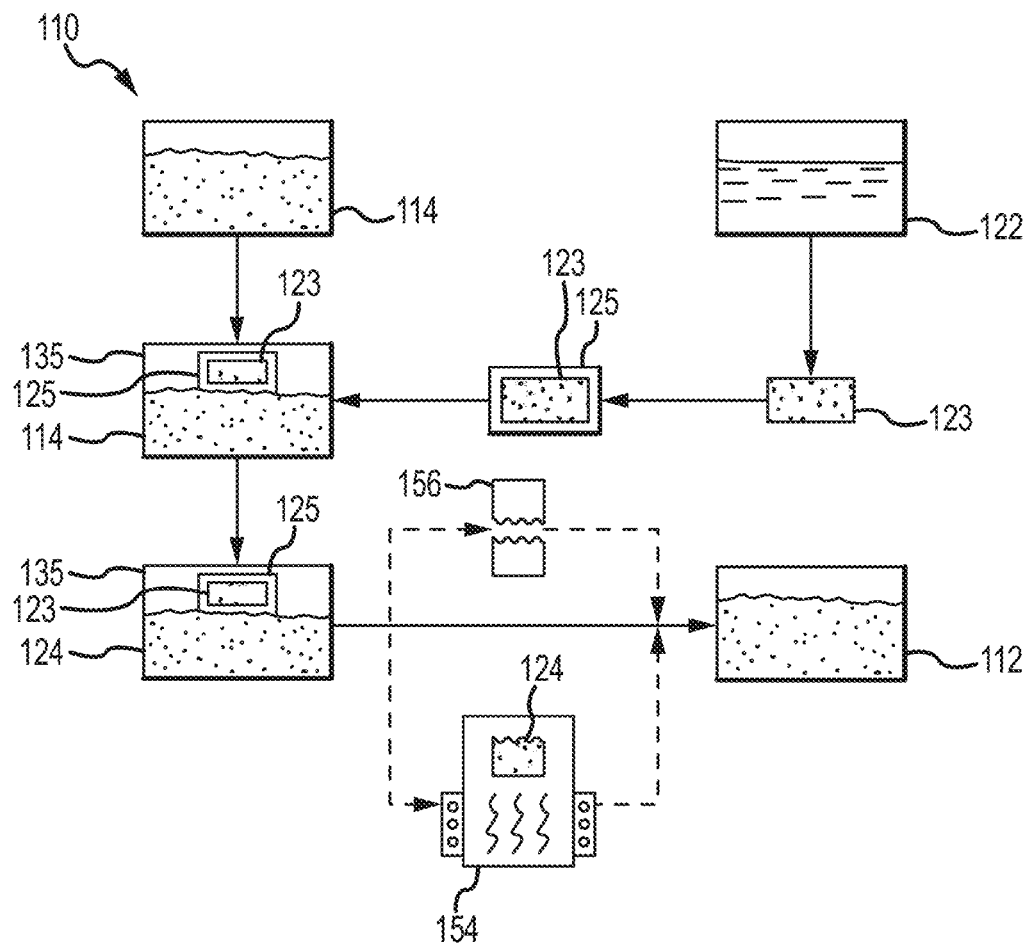
FIG. 19 is a schematic representation of basic process steps in another embodiment of a method of producing a treated ammonium octamolybdate composition.

In another embodiment 110, shown in FIG. 19, solvent 122 may be applied to the AOM precursor material 114 by means of an intermediate adsorbent 123. More specifically, solvent 122 may be applied to intermediate adsorbent 123 to form a solvent-laden intermediate adsorbent 123. The solvent-laden intermediate adsorbent 123, may then be placed within in a gas-permeable container or bag 125. Thereafter, the solvent-laden intermediate adsorbent 123 (along with gas-permeable bag 125, if used) may then be placed in a container 135, along with a quantity of the AOM precursor material 114. The container 135 may then be sealed (e.g., made substantially air-tight). Solvent 122 from the solvent-laden adsorbent 123 will be gradually desorbed from the intermediate adsorbent 123 (and pass through the permeable container or bag 125, if used) before being adsorbed by the AOM precursor material 114 in order to form a moistened intermediate powder composition 124. The desorption/adsorption process is allowed to continue for a time sufficient to produce a treated AOM composition 112. During the desorption/adsorption process the particle size distribution of the AOM precursor powder material 114 is changed or transformed from a substantially bi-modal particle size distribution to a substantially uni-modal particle size distribution.

As was the case for the other embodiments, solvent 122 may comprise any of a wide range of materials, such as water, alcohols, or hydrocarbon materials. The intermediate adsorbent 123 may comprise any of a wide range of materials suitable for adsorbing the particular solvent 122 and later desorbing or releasing quantities of the solvent 122 when the adsorbent 123 is placed in the sealed container 135. By way of example, in one embodiment the solvent 122 comprises deionized water and the intermediate adsorbent 123 comprises amorphous precipitated silica (i.e., "silica gel"). The solvent 122 (e.g., deionized water) and silica gel adsorbent 123 should be provided in quantities sufficient to allow sufficient amounts of solvent 122 be desorbed from the adsorbent 123 and subsequently adsorbed by the AOM precursor material 114 to produce the treated AOM composition 112. Generally speaking, the addition of an intermediate adsorbent 123 having adsorbed solvent 122 (e.g., water) in a range of about 0.3% by weight to about 0.5% by weight of the total amount of AOM precursor material 114 to be treated should be sufficient.

As was the case for the method 10, the method 110 may optionally involve additional treatment steps. For example, the moistened intermediate product 124 may be further heated and/or dried in an oven or dryer 154 in order to further reduce the level of any residual moisture that may be contained in the intermediate product 124 and/or further reduce the loss-on-drying (LOD) specification of the treated AOM composition 112. If used, such heating may be conducted at any of a wide range of temperatures sufficient to liberate the moisture, such as, for example, temperatures ranging from about 80° C. to about 100° C. when deionized water is used as the solvent 122.

The intermediate product 124 may also be subjected to an additional grinding or comminution step 156, either with our without additional heating step 154, in order to break up any larger agglomerations that may have formed during the treatment process.

Figure 20:
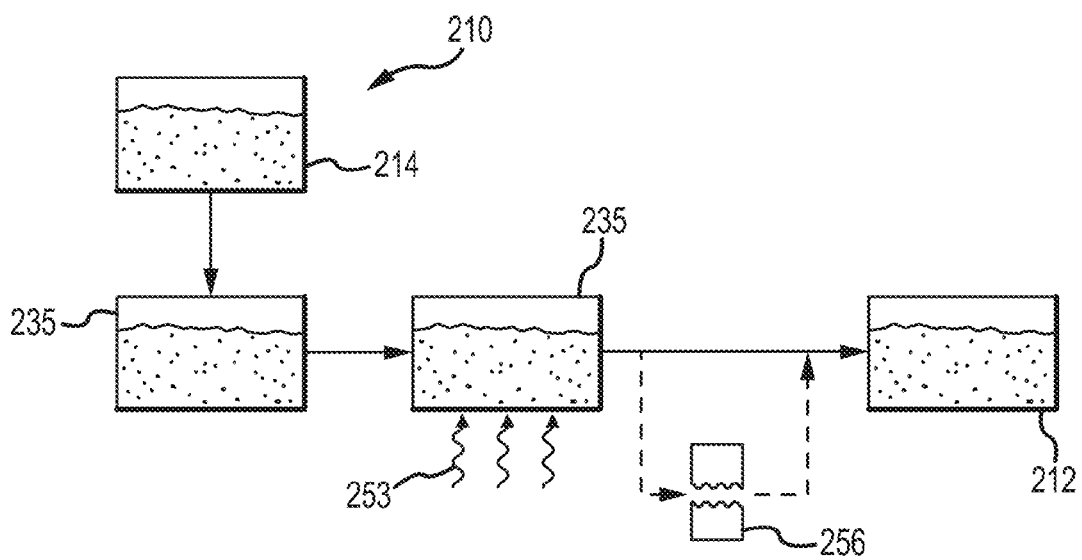
FIG. 20 is a schematic representation of basic process steps in yet another embodiment of a method of producing a treated ammonium octamolybdate composition.

In still yet another embodiment 210 shown in FIG. 20, a treated AOM composition 212 may be produced by heating a quantity of AOM precursor material 214 for a time sufficient to change the particle size distribution from a bi-modal distribution to a substantially uni-modal distribution. In such an embodiment 210, the AOM precursor material 214 must contain sufficient levels of retained moisture to allow the treated AOM composition 212 to be produced. Generally speaking, we have found that an AOM precursor material 214 having a retained moisture level corresponding to a loss on drying (LOD), in weight percent, of at least about 0.10 wt. %, and more preferably in a range of about 0.10 wt. % to about 0.2 wt. %, will be sufficient to produce a treated AOM composition 212 having the desired uni-modal particle size distribution.

The treated AOM composition 212 may be produced by placing a quantity of AOM precursor material 214 (i.e., having sufficient levels of retained moisture, as measured by the LOI, in wt. %) into a container 235 and sealing the container 235 so that it is substantially air-tight. The sealed container 235 may then be heated at step 253 to a temperature of at least about 30° C., and more preferably in a range of about 30° C. to about 50° C. for a time sufficient to produce a treated AOM composition 212 having the desired uni-modal particle size distribution. Generally speaking, heating 253 conducted for a time of at least about 7 days, and more preferably in a range of about 7-10 days, will be sufficient for this purpose.

Significantly, we have discovered that the retained moisture in the AOM precursor material 214 is recycled during the treatment process, thereby allowing fairly "fresh" i.e., recently thermally decomposed AOM precursor material 214 (i.e., having a low moisture content) to provide sufficient moisture for the treatment process. That is, moisture adsorbed into the smaller particles during the capillary condensation process tends to be released after the agglomeration process, thereby making the moisture available for additional capillary condensation at other particle sites. For example, after being sealed in container 235, most AOM precursor materials 214 will contain sufficient retained moisture to elevate the relative humidity in the sealed container 235 to levels in a range of 80-100%, which is sufficient to result in the production of a treated AOM composition 212 within a reasonable amount of time (e.g., 7-10 days).

Method 210 may optionally involve additional treatment steps. For example, treated AOM powder product 212 may be subjected to an additional grinding or comminution step 256 in order to break up any larger agglomerations that may have formed during the treatment process.

The treated AOM compositions, e.g., 12, 112, 212, may be used to advantage in the production of AOM-based optically-markable ink and polymer compositions. In one embodiment, the treated AOM compositions 12, 112, 212, may be used to replace some or all of the conventional AOM required by the particular formulation in order to achieve one or more the performance improvements and advantages described herein.

EXAMPLES

Various example compositions of the treated α-AOM product 12 according to the teachings provided herein were produced by three variations of the disclosed treatment processes 10, referred to herein as "Bed Steaming," "Rotary Dryer Steaming," and "Solvent Misting" processes. In the bed steaming process, a thin layer or bed of α-AOM precursor material was placed in a shallow container or "boat," which was then placed in a 100° C. oven at 100% relative humidity, as further described below. The treated AOM compositions 12 prepared by the rotary dryer steaming process were obtained by placing the α-AOM precursor material 14 in a rotary dryer or tumbler 34 having a steam port 32 provided therein. Finally, the treated AOM compositions 12 produced by the solvent misting process were obtained by subjecting the α-AOM precursor material 14 in rotary tumbler 34 to a spray of atomized water 25. Additional details regarding the particular process parameters, precursor materials, and treated products for the various treatment processes are provided below.

Bed Steaming Process

Five separate trials, referred to herein as Trials 1-5, were conducted in which treated α-AOM compositions 12 were prepared from two different types of α-AOM precursor powder materials 14. In the first four trials (i.e., Trials 1-4), a commercially-available or "standard" α-AOM precursor material 14 was used. The standard α-AOM precursor material 14 exhibited a bi-modal particle size distribution 16 (FIG. 2) typical for such material 14. The standard α-AOM precursor material 14 was treated, either partially (in the case of Trials 1 and 2) or fully (in the case of Trials 3 and 4) to produce corresponding partially- or fully-treated α-AOM compositions. Trial 5 involved the treatment of a "supermilled" α-AOM precursor material 14. The supermilled precursor material was subjected to additional milling in a hammer mill to produce a precursor material 14 having a nearly uni-modal particle size distribution, as best seen in FIG. 6.

Certain characteristics of the two different types of α-AOM precursor powder materials 14 (i.e., standard and supermilled) are provided in Table I. The particle characteristics were obtained by mixing a small sample of each of the α-AOM precursor materials with isopropyl alcohol and analyzing the mixture in a Cilas laser particle size analyzer. Corresponding particle histograms and plots of cumulative undersized particle distribution were also produced by the Cilas particle size analyzer and are reproduced in FIG. 2 (for the standard α-AOM precursor powder material) and FIG. 6 (for the supermilled α-AOM precursor powder material).

TABLE I

Figure 6:
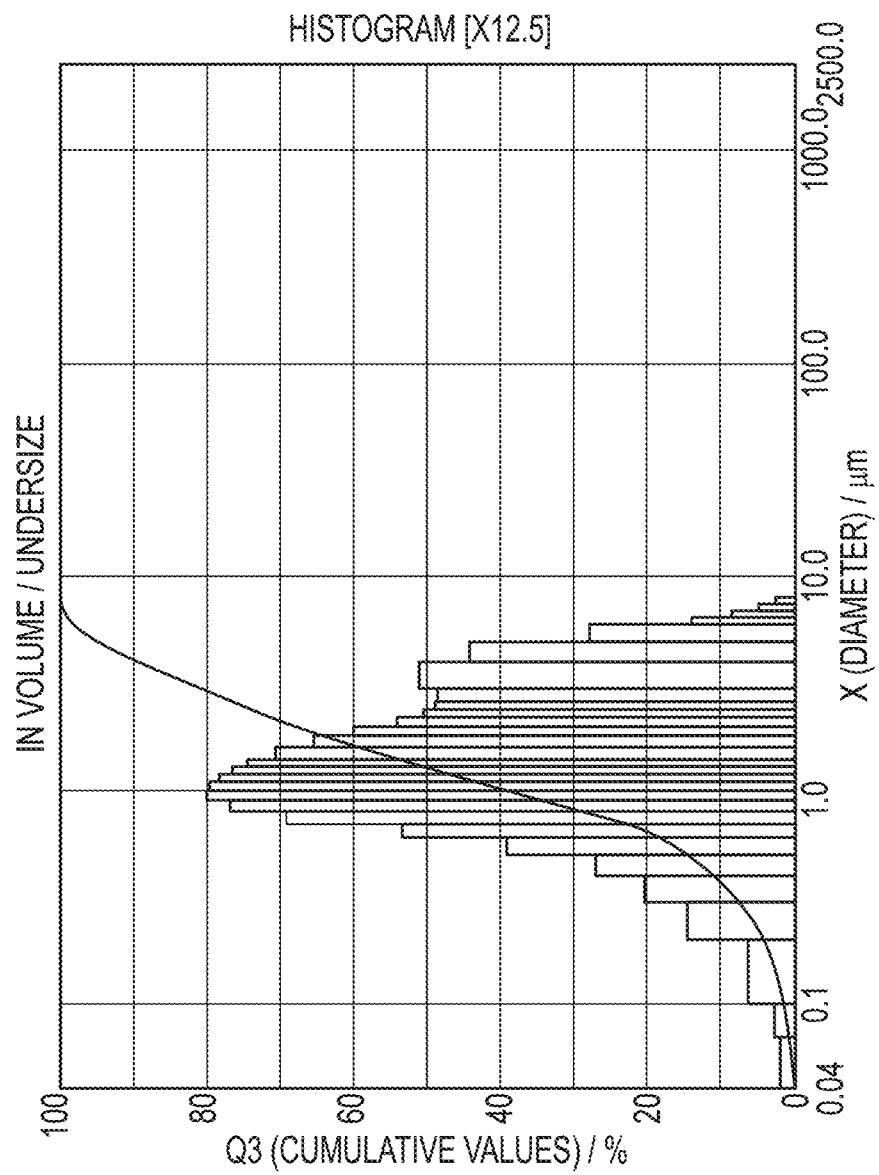
FIG. 6 is a particle size histogram and plot of cumulative undersize distribution of a "supermilled" ammonium octamolybdate precursor material.

| Parameter/Characteristic | α-AOM Precursor Material | |
|---|---|---|
| | Standard α-AOM | "Supermilled" α-AOM |
| Ultrasound Time (s) | 60 | 60 |
| Obscuration | 12/0.61% | 3/0.59% |
| D10 (μm) | 0.64 | 0.37 |
| D50 (μm) | 2.43 | 1.25 |
| D90 (μm) | 8.58 | 4.03 |
| Mean Diameter (μm) | 3.75 | 1.77 |
| Particle Histogram | FIG. 2 | FIG. 6 |

All of the trials (i.e., Trials 1-5) involved the application of steam and/or heat to both types of α-AOM precursor materials 14 (i.e., standard and supermilled precursor materials), in the manner described below to produce the various trial compositions. As noted herein, Trials 1 and 2 involved the partial treatment of the standard α-AOM precursor material 14 to produce partially-treated α-AOM powder compositions. Trial 1 involved a first partial treatment of the standard precursor material 14, while Trial 2 involved the additional treatment of the Trial 1 composition. Particle size data for the Trial 1 and Trial 2 compositions are presented in Table II. Particle size histograms of the Trial 1 and 2 compositions are reproduced in FIGS. 7 and 8, respectively, and illustrate the gradual progression of the powder from a bi-modal particle size distribution to a uni-modal particle size distribution.

Trial 3 involved the full treatment of the standard α-AOM precursor material 14 to produce a fully-treated α-AOM composition 12. Particle size data for the fully-treated AOM composition of Trial 3 are also presented in Table II. The particle size histogram of the Trial 3 composition is reproduced in FIG. 9.

Trial 4 also involved a full treatment of the standard α-AOM precursor material 14 but involved a larger sample size (1 kg. of precursor material 14) compared to the smaller sample sizes of Trials 1-3 (50 g. of precursor material 14). Particle size data and histograms of three individual samples of the fully treated AOM composition of Trial 4 are presented in Table III and FIGS. 3, 10(a), and 10(b), respectively.

Trial 5 involved the full treatment of 100 g. of the supermilled α-AOM precursor material 14. Particle size data and histograms of three individual samples of the fully treated AOM composition of Trial 5 are presented in Table IV and FIGS. 11(a-c).

Trials 1 and 2:

As mentioned, Trials 1 and 2 involved the partial treatment of 50 g. of the standard α-AOM precursor powder material 14. The standard α-AOM precursor material 14 comprised thermally-reduced or "dry" α-AOM commercially-available from the Climax Molybdenum Company, Ft. Madison operations, as noted herein. The 50 g. sample of standard α-AOM precursor material 14 was spread out in a thin layer or bed in a shallow open container and placed into a 100° C. oven having a container of boiling water provided therein. The boiling water in the oven was used to maintain the relative humidity at about 100% during the treatment process. The precursor material 14 was heated and subjected to steam in this manner for about 6 hours in order to produce a partially-treated AOM powder composition. The partially-treated AOM powder composition of Trial 1 was then removed from the oven and permitted to cool and dry at room temperature for about 1 hour. A small sample of the Trial 1 composition was then mixed with isopropyl alcohol and analyzed in a Cilas laser particle size analyzer as described herein.

Trial 2 was a continuation of Trial 1 and involved returning the Trial 1 composition to the oven and subjecting the composition to additional heating at 100° C. and 100% relative humidity. The Trial 2 composition was heated and subjected to steam for an additional 8 hours. The partially-treated Trial 2 composition was then removed from the oven and allowed to cool and dry at room temperature for about 1 hour. A small portion of the Trial 2 composition was then mixed with isopropyl alcohol and analyzed in the Cilas laser particle size analyzer.

Particle size data for the Trial 1 and 2 compositions are presented in Table II. Particle histograms for the powder compositions of Trials 1 and 2 are reproduced in FIGS. 7 and 8, respectively. As can be seen from the histograms, partial treatment of the AOM precursor material 14 leads to a gradual reduction in the magnitudes of the two modal peaks with increasing treatment times. Note however, the appearance of an additional modal peak at a particle size of about 0.3 μm for the Trial 2 composition. It is believed that the appearance of this modal peak is the result of the break-up of agglomerated particles from the sonicator of the Cilas laser particle size analyzer.

Trial 3:

The procedure for Trial 3 was similar to that used for Trials 1 and 2, except that Trial 3 involved the full treatment of 1 kg. of the standard α-AOM precursor material 14. The standard α-AOM precursor material 14 again comprised thermally-reduced or "dry" α-AOM powder commercially available from the Climax Molybdenum Company, as noted herein. The standard α-AOM precursor material 14 was spread out in a thin layer or bed in a shallow open container and heated in a 100° C. oven at 100% relative humidity for a time of about 70 hours. The fully-treated AOM composition of Trial 3 was then removed and permitted to cool and dry at room temperature for about 2 hours, although the cooling time is not critical.

A small sample of the Trial 3 composition was then mixed with isopropyl alcohol and analyzed in a Cilas laser particle size analyzer. Particle size data for the Trial 3 sample are also presented in Table II. The corresponding particle size histogram is reproduced in FIG. 9. The Trial 3 sample is fully uni-modal, with the exception of the modal peak, again at about 0.3 μm. Again, the presence of the modal peak at about 0.3 μm is believed to be a consequence of the action of the sonicator of the laser particle analyzer.

TABLE II

Figure 7:
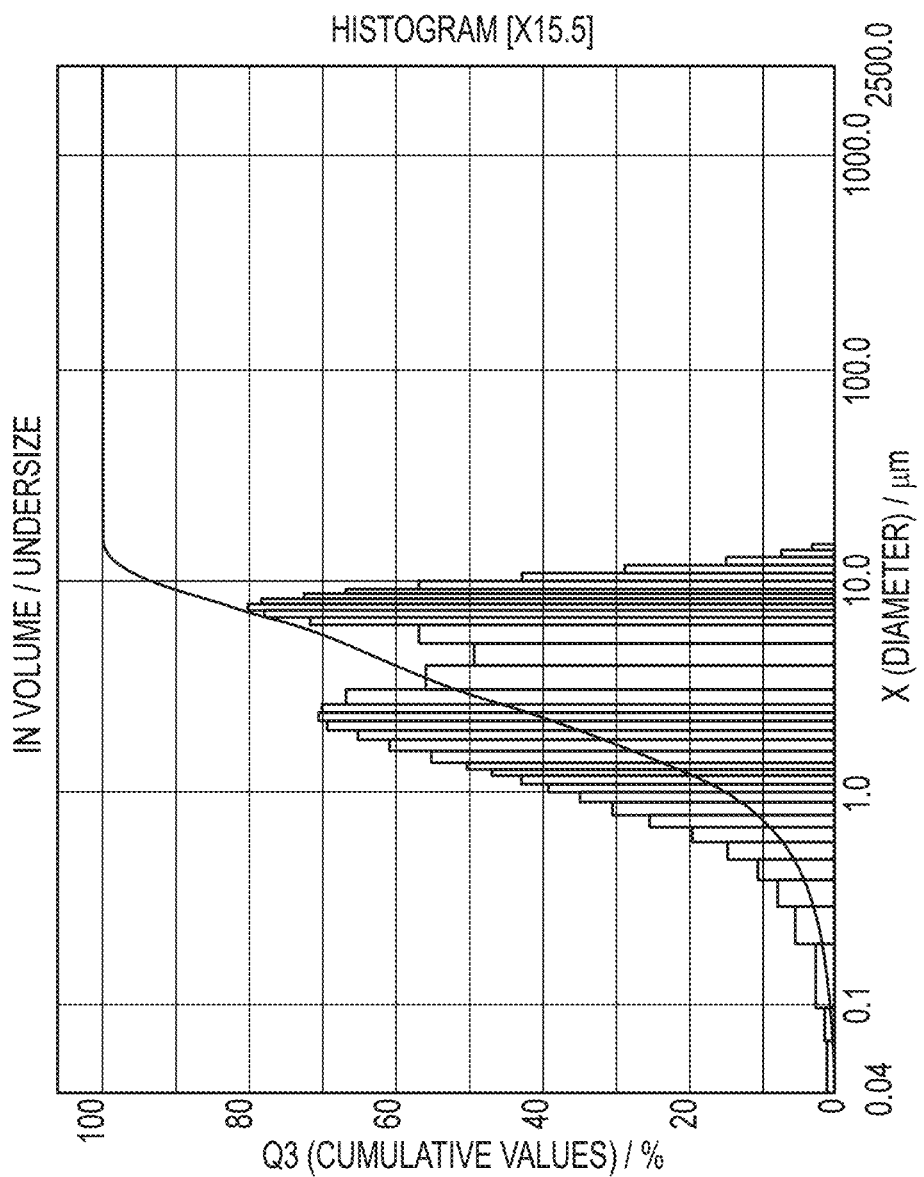
FIG. 7 is a particle size histogram and plot of cumulative undersize distribution of a partially treated ammonium octamolybdate powder composition of Trial 1 of the bed steaming process.
Figure 8:
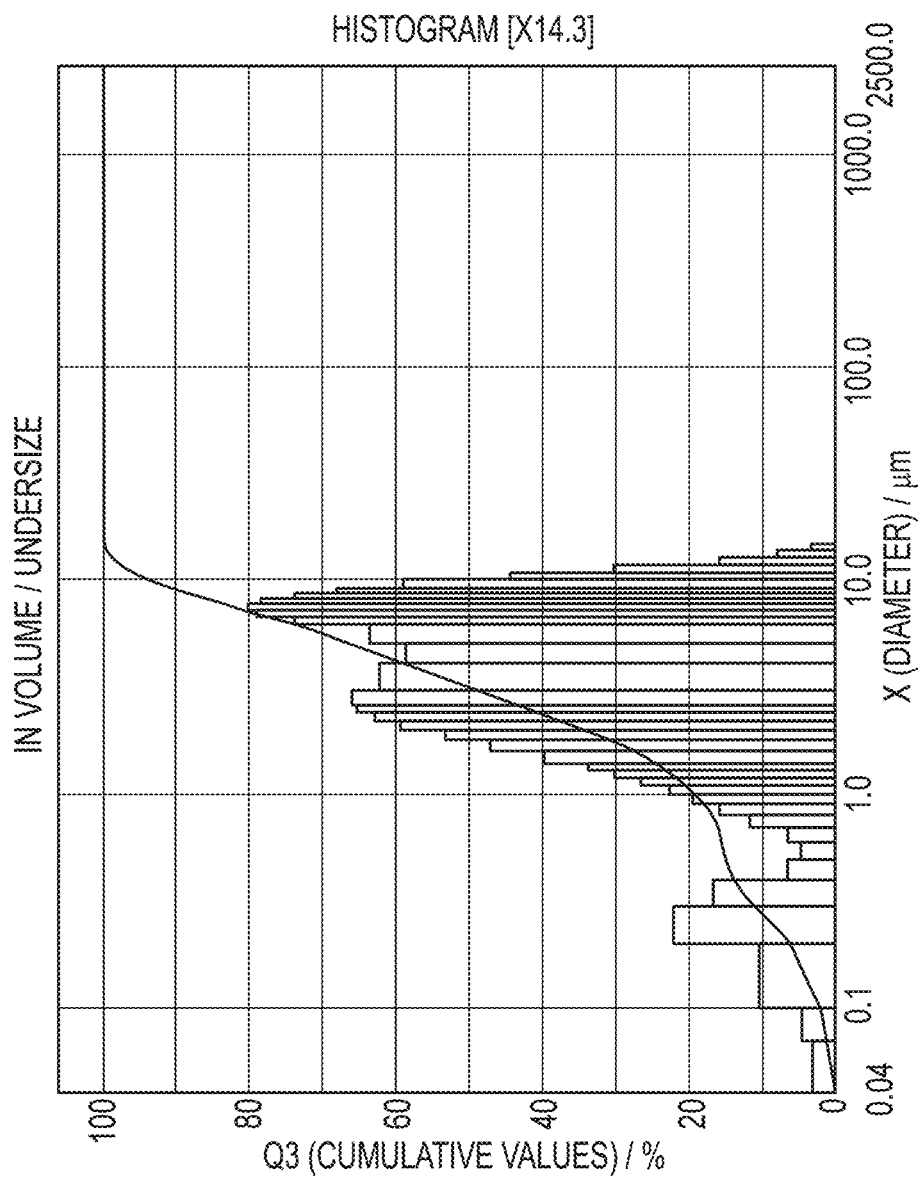
FIG. 8 is a particle size histogram and plot of cumulative undersize distribution of a partially treated ammonium octamolybdate powder composition of Trial 2 of the bed steaming process.
Figure 9:
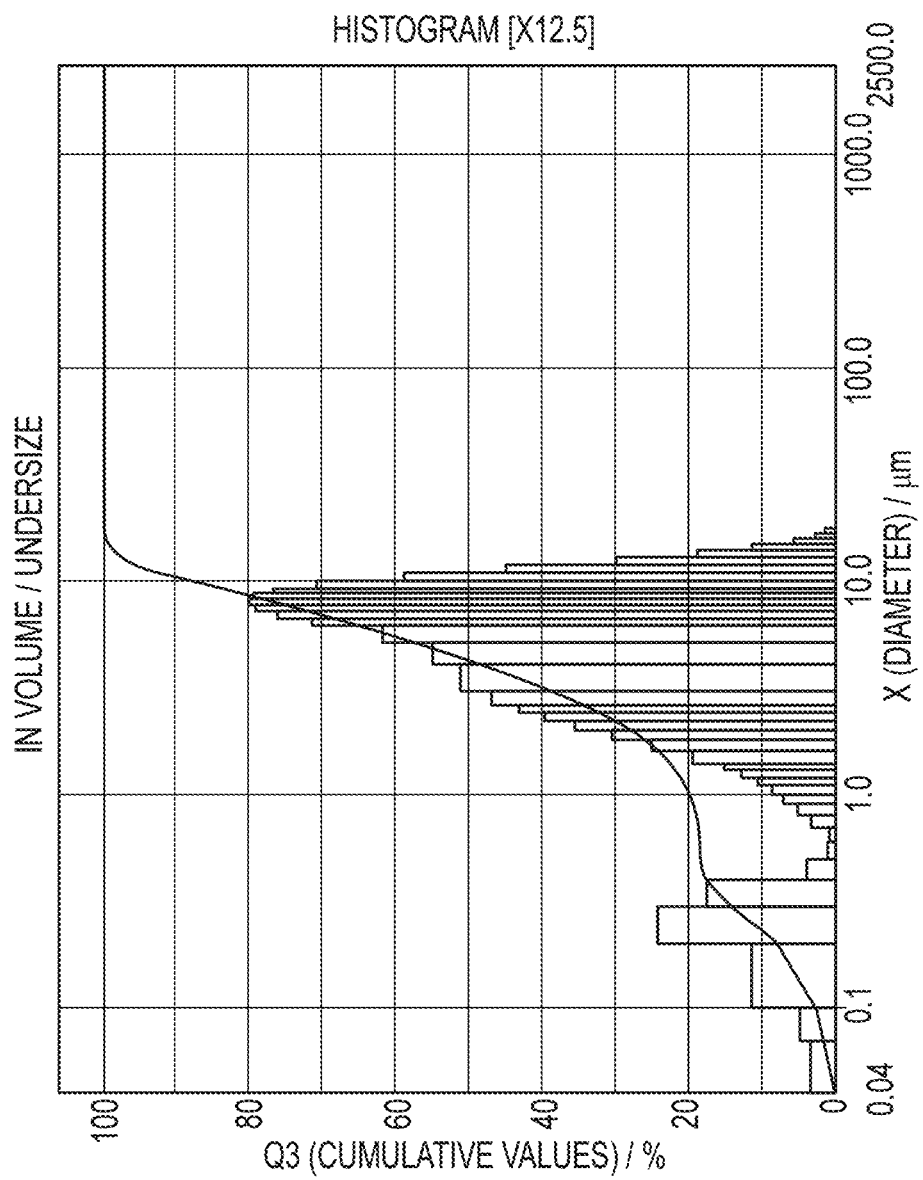
FIG. 9 is a particle size histogram and plot of cumulative undersize distribution of a treated ammonium octamolybdate powder composition of Trial 3 of the bed steaming process.

| | α-AOM Composition | | |
|---|---|---|---|
| Parameter/Characteristic | Trial 1 (Partially-Treated) | Trial 2 (Partially-Treated) | Trial 3 (Fully-Treated) |
| Ultrasound Time (s) | 60 | 60 | 60 |
| Obscuration | 8/0.57% | 8/0.58% | 8/0.60% |
| D10 (μm) | 0.76 | 0.27 | 0.22 |
| D50 (μm) | 2.83 | 3.08 | 4.08 |
| D90 (μm) | 8.64 | 8.71 | 9.94 |
| Mean Diameter (μm) | 3.94 | 3.96 | 4.72 |
| Histogram | FIG. 7 | FIG. 8 | FIG. 9 |

Trial 4:

Trial 4 involved the treatment of 1 kg. of standard α-AOM precursor material 14. The standard α-AOM precursor material 14 again comprised thermally-reduced or "dry" α-AOM from the Climax Molybdenum Company. The AOM precursor material 14 was spread out in a thin bed in a shallow open container and placed in a 100° C. oven having a container of boiling water provided therein. The AOM precursor material 14 was maintained at 100° C. in an atmosphere of 100% relative humidity for a time of about 72 hours. The Trial 4 composition was then dried at an elevated temperature of 105° C.

Three individual samples of the Trial 4 composition were then mixed with isopropyl alcohol and analyzed in the Cilas laser particle size analyzer. Particle size data for the three samples of the Trial 4 composition are presented in Table III. Particle size histograms for the three samples are reproduced in FIGS. 3, 10(*a*), and 10(*b*).

As can be seen from the histograms for the three samples, the Trial 4 composition is fully uni-modal, with the modal peaks for the various samples occurring at particle sizes ranging from about 5 μm to about 6 μm. Note that none of the histograms of the three samples of the Trial 4 composition display a modal peak at the smaller particle sizes. It is believed that the samples of the Trial 4 compositions did not suffer from particle break-up due to sonication during the measurement process.

TABLE III

Figure 10A:
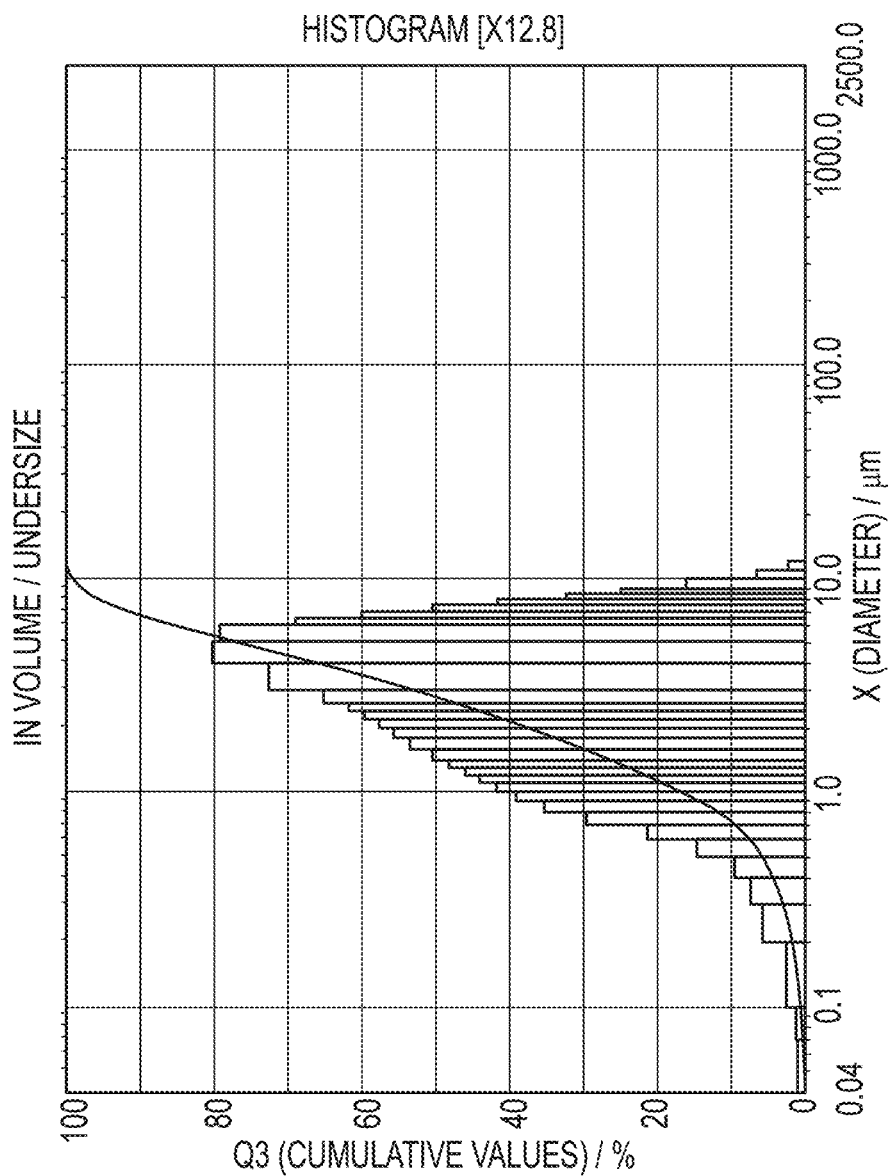
FIGS. 10(a-b) are particle size histograms and corresponding plots of cumulative undersize distributions of second and third sample portions of a treated ammonium octamolybdate powder composition of Trial 4 of the bed steaming process.
Figure 10B:
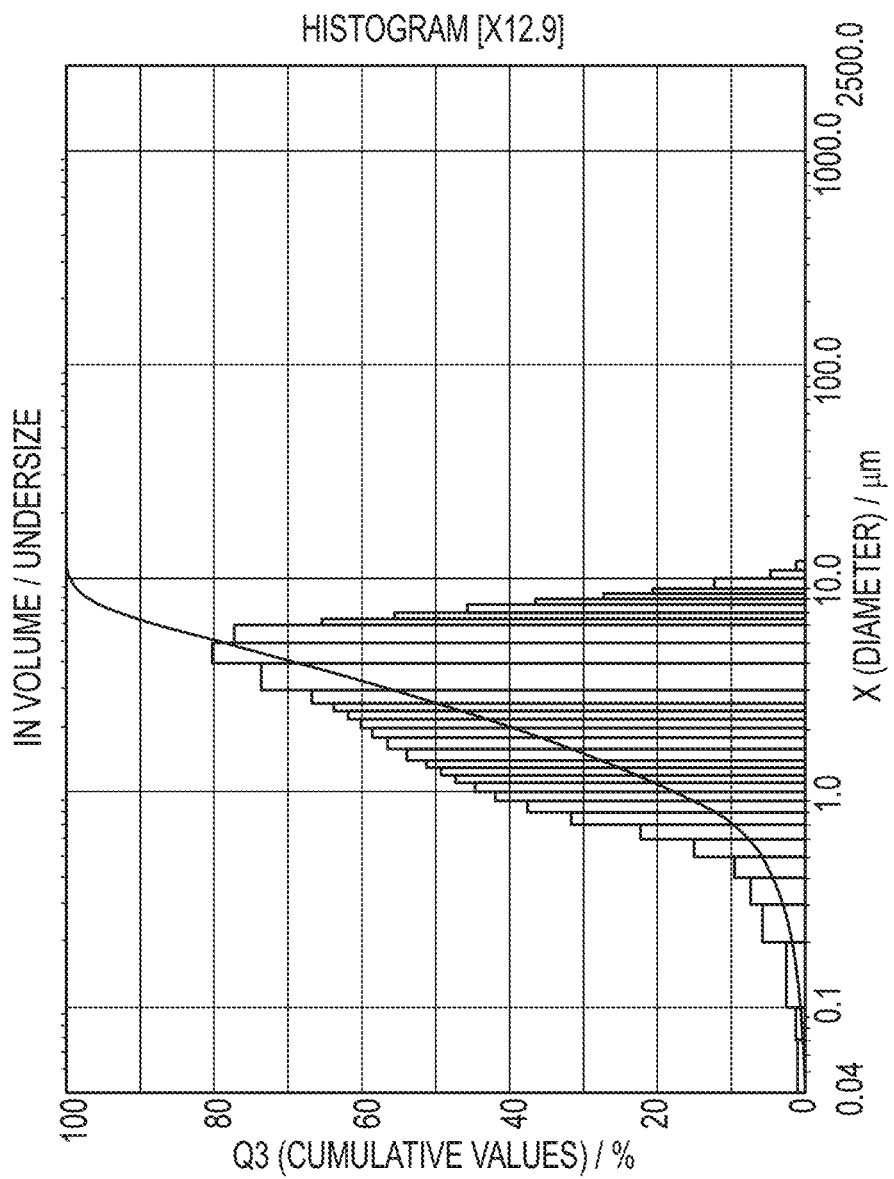

| Parameter/ Characteristic | Trial 4 α-AOM Composition | | |
|---|---|---|---|
| | Sample 1 | Sample 2 | Sample 3 |
| Ultrasound Time (s) | 60 | 60 | 60 |
| Obscuration | 20/0.50% | 20/0.45% | 20/0.43% |
| D10 (μm) | 0.76 | 0.72 | 0.72 |
| D50 (μm) | 2.97 | 2.76 | 2.63 |
| D90 (μm) | 6.93 | 6.53 | 6.30 |
| Mean Diameter (μm) | 3.46 | 3.25 | 3.13 |
| Histogram | FIG. 3 | FIG. 10(a) | FIG. 10(b) |

Trial 5:

Trial 5 involved the treatment of about 100 g. of the "super-milled" α-AOM precursor material 14. The supermilled α-AOM precursor material 14 was made by milling the standard, thermally-reduced or "dry" α-AOM from the Climax Molybdenum Company in a hammer mill until the particle size distribution was nearly uni-modal. See FIG. 6. The supermilled α-AOM precursor material 14 was spread out in a thin bed in a shallow open container and placed in a 100° C. oven along with a container of boiling water. The supermilled α-AOM precursor material 14 was maintained at 100° C. in an atmosphere of 100% relative humidity for a time of about 72 hours. The Trial 5 composition was then dried at an elevated temperature of about 105° C. Three individual samples of the Trial 5 composition were then mixed with isopropyl alcohol and analyzed in the Cilas laser particle size analyzer. Particle size data for the three samples of the Trial 5 composition are presented in Table IV. Particle size histograms for the three samples are reproduced in FIGS. 11(*a-c*).

The Trial 5 composition is fully uni-modal, with the modal peaks occurring at particle sizes of about 10 μm for the various samples. As was the case for the Trial 4 composition, the histograms of the three samples of the Trial 5 composition also do not display modal peaks at the smaller particle sizes. It is believed that the samples of the Trial 5 compositions also did not suffer from particle break-up due to sonication during the measurement process.

TABLE IV

Figure 11A:
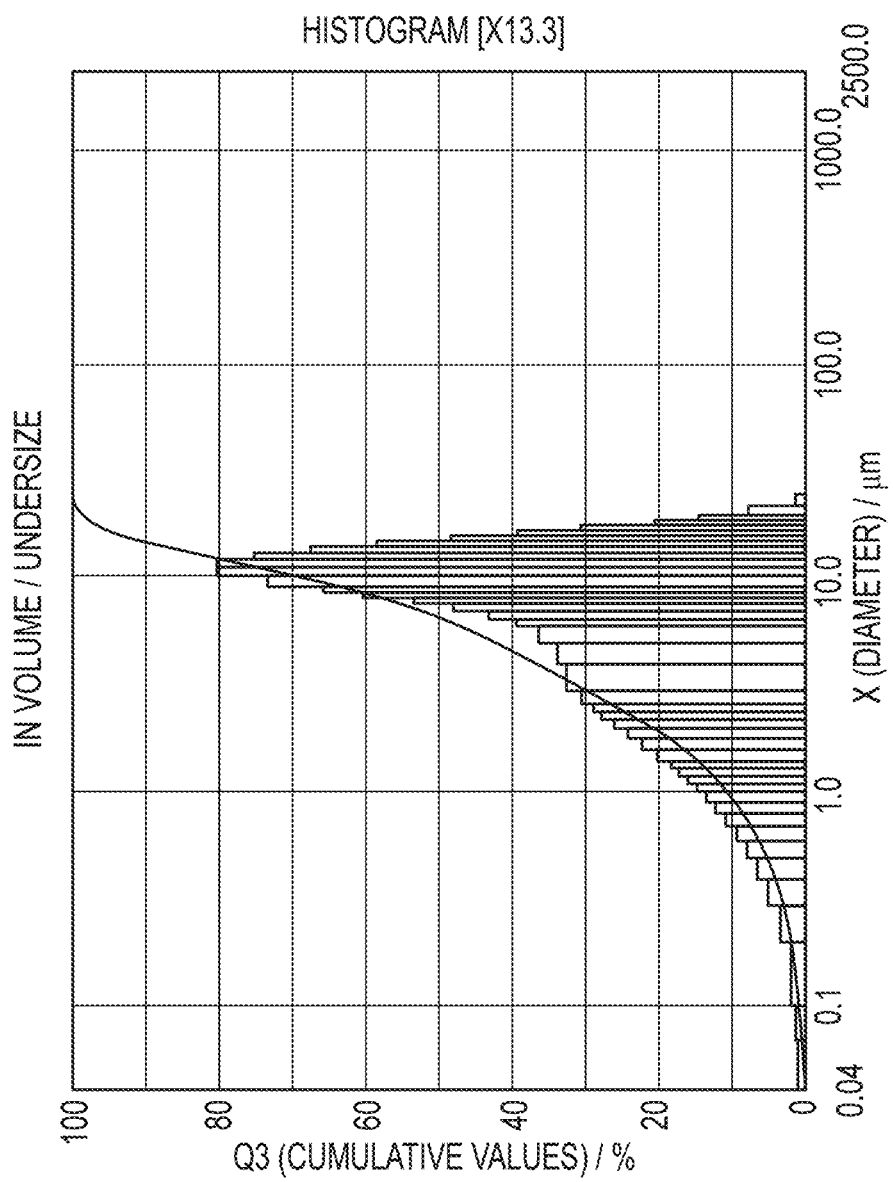
FIGS. 11(a-c) are particle size histograms and plots of corresponding cumulative undersize distributions of first, second, and third sample portions of a treated ammonium octamolybdate powder composition of Trial 5 of the bed steaming process.
Figure 11B:
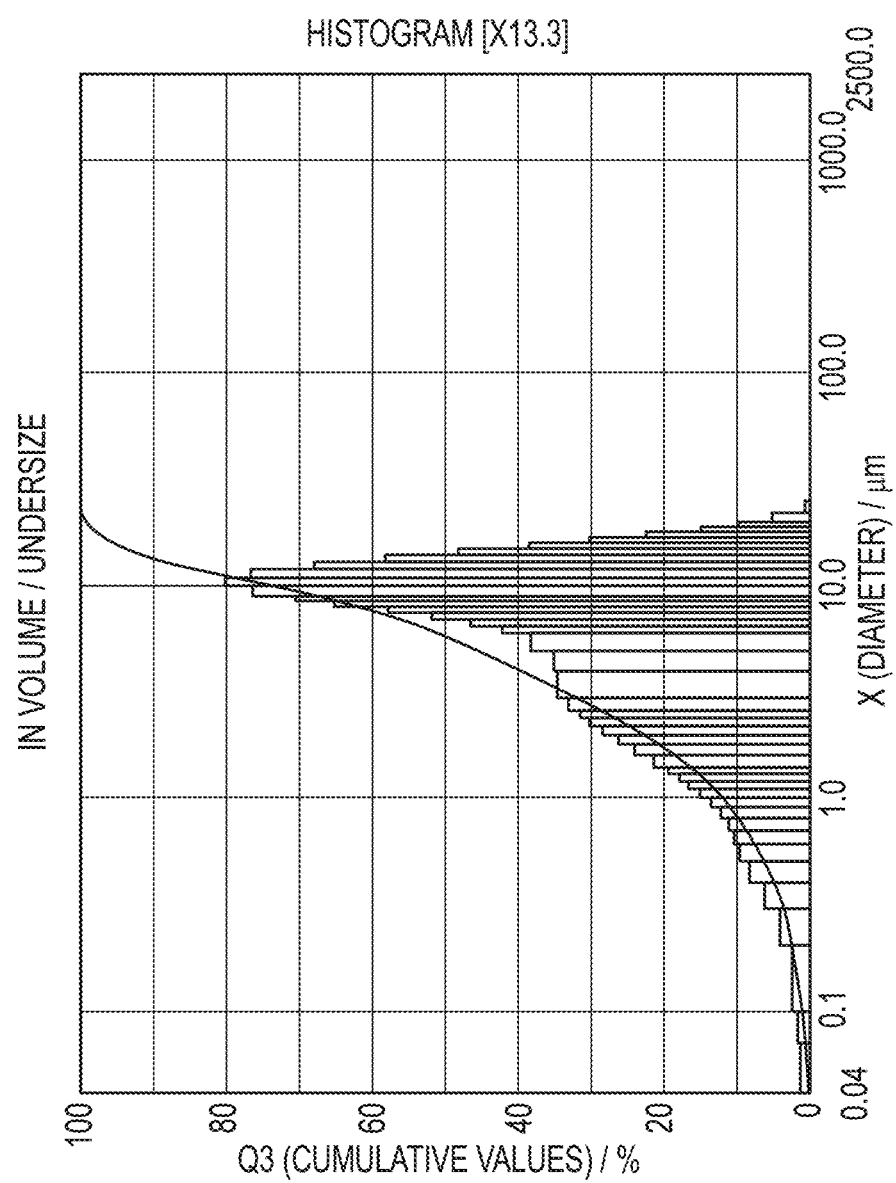
Figure 11C:
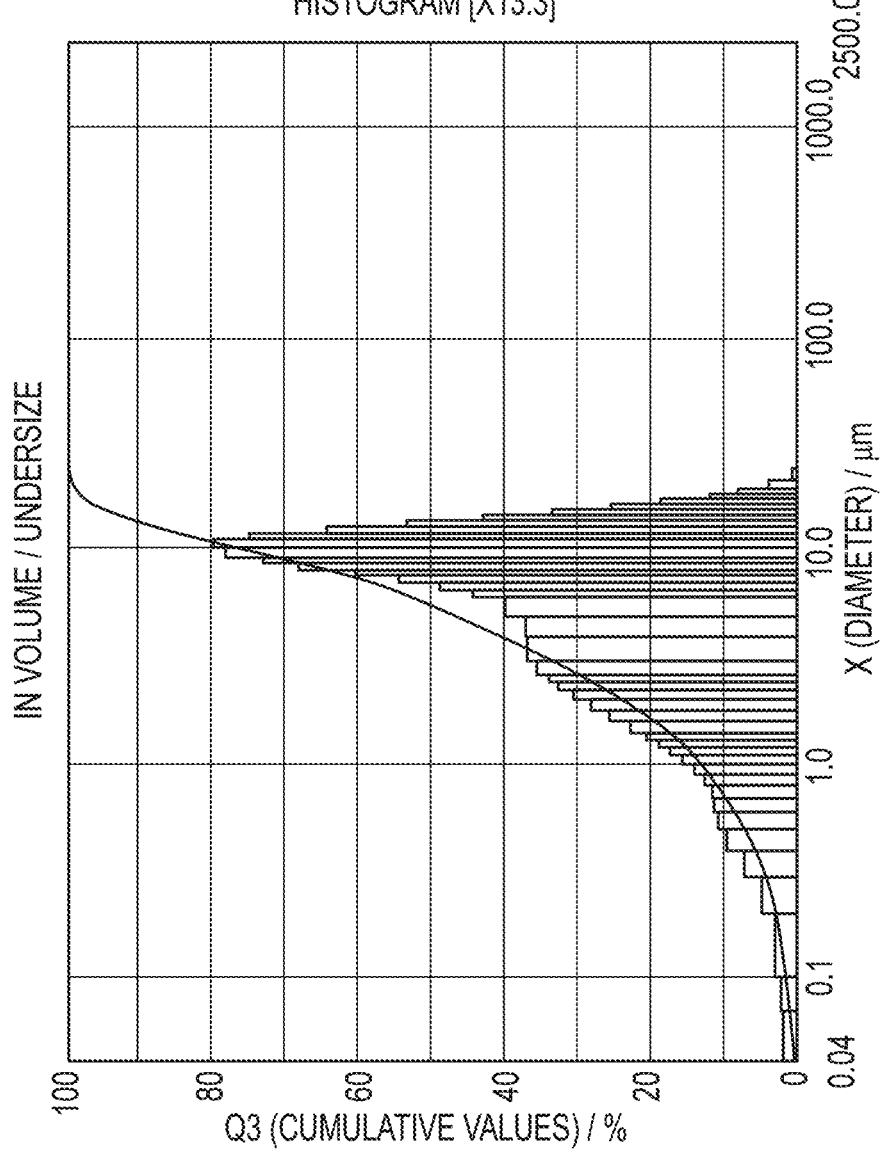

| Parameter/ Characteristic | Trial 5 α-AOM Composition | | |
|---|---|---|---|
| | Sample 1 | Sample 2 | Sample 3 |
| Ultrasound Time (s) | 60 | 60 | 60 |
| Obscuration | 18/0.54% | 19/0.51% | 19/0.51% |
| D10 (μm) | 0.93 | 0.80 | 0.71 |
| D50 (μm) | 6.42 | 5.79 | 5.38 |
| D90 (μm) | 14.24 | 13.43 | 12.91 |
| Mean Diameter (μm) | 7.07 | 6.57 | 6.26 |
| Histogram | FIG. 11(a) | FIG. 11(b) | FIG. 11(c) |

Rotary Dryer Steaming Process

The rotary dryer steaming process involved placing a quantity of AOM precursor powder material 14 into a rotary drum tumbler 34 and subjecting the precursor material 14 to steam while tumbling. The resulting moistened intermediate powder product 24 was then removed from the tumbler 34 and allowed to dry. No heat was applied to the sample either during or after the steaming process.

This particular example involved the treatment of about 2 kg. of standard AOM precursor powder material 14. The standard α-AOM precursor material 14 again comprised thermally-reduced or "dry" α-AOM from the Climax Molybdenum Company. Particle size data and a histogram of the α-AOM precursor material are presented in Table V and FIG. 12, respectively. Note that the particle size data and histograms for the rotary dryer steaming process were produced by the Microtrac particle size analyzer, as noted herein. The AOM precursor material 14 was then placed into the tumbler 34 and subjected to steam. After tumbling and steaming, the moistened intermediate powder 24 was removed from the tumbler 34.

A sample of the rotary dryer steamed composition was then mixed with isopropyl alcohol and analyzed in a Microtrac laser particle size analyzer. Particle size data for the sample composition are presented in Table V. A particle size histogram for the sample is reproduced in FIG. 13.

As can be seen from the histogram for the sample, the rotary dryer steamed composition is primarily uni-modal, with the modal peak occurring at a particle size of about 10 μm. Note that the histogram of the rotary dryer steamed composition does display a small modal peak at about 0.2 μm. Again, it is believed that the appearance of this modal peak is the result of the break-up of agglomerated particles from the sonicator of the Microtrac laser particle size analyzer.

TABLE V

Figure 12:
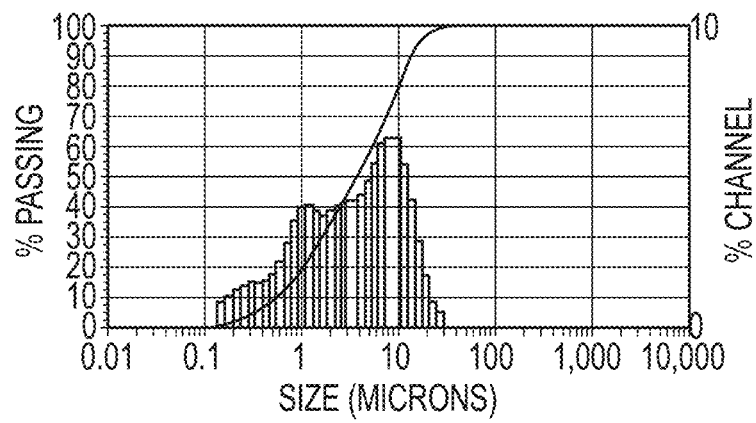
FIG. 12 is a particle size histogram and plot of cumulative undersize distribution of the ammonium octamolybdate precursor powder material used for the rotary dryer steaming process.
Figure 13:
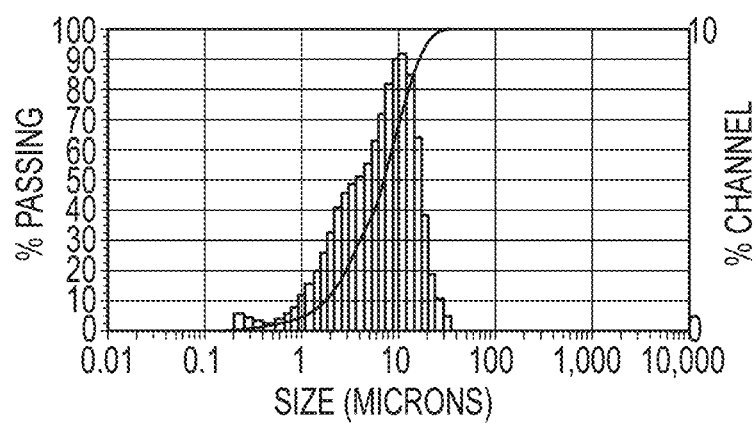
FIG. 13 is a particle size histogram and plot of cumulative undersize distribution of a treated ammonium octamolybdate powder composition produced by the rotary dryer steaming process.

| Parameter/ Characteristic | α-AOM Precursor Material | Treated α-AOM Composition |
|---|---|---|
| Ultrasound Time (s) | 30 | 30 |
| D10 (μm) | 0.521 | 1.744 |
| D50 (μm) | 3.57 | 7.41 |
| D90 (μm) | 13.17 | 16.85 |
| Mean Diameter (μm) (vol. dist.) | 5.54 | 8.53 |
| Mean Diameter (μm) (number dist.) | 0.252 | 0.338 |
| Mean Diameter (μm) (area dist.) | 1.368 | 3.32 |
| Particle Histogram | FIG. 12 | FIG. 13 |

Solvent Misting Process

The solvent misting process involved placing a quantity of AOM precursor powder material 14 into a rotary drum tumbler 34 and subjecting the precursor material 14 to an atomized spray of water while tumbling. The moistened intermediate powder product 24 was then removed from the tumbler 34 and allowed to dry. No heat was applied to the sample either during or after the solvent misting process.

Four separate trials (Trials 1-4) were conducted in which treated α-AOM compositions 12 were prepared from a pre-treated α-AOM precursor powder material. The pre-treated α-AOM powder material was made from the standard α-AOM precursor material to which water in the amount of 0.14% by weight had been added. Particle data for the pre-treated precursor material is presented in Table VI. A particle histogram of the pre-treated material is reproduced in FIG. 14. The particle data and histograms for the materials involved with the solvent misting process were produced by the Microtrac laser particle size analyzer.

Figure 14:
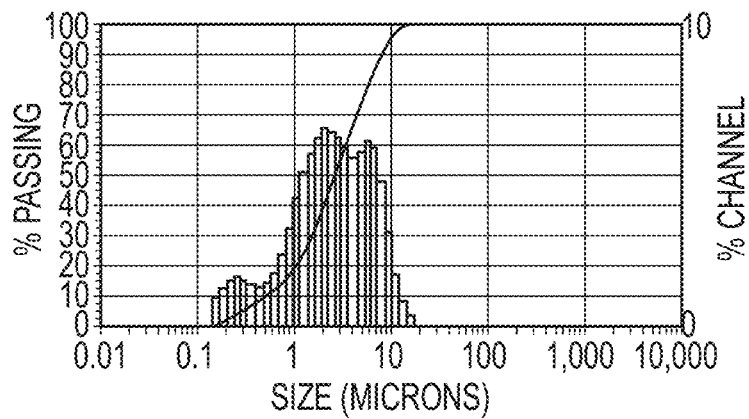
FIG. 14 is a particle size histogram and plot of cumulative undersize distribution of a pretreated ammonium octamolybdate precursor powder material used for the solvent misting process.

As can be seen from FIG. 14, the pre-treated α-AOM material had a bi-modal particle size distribution, with a small third modal peak at a particle size diameter of about 0.3 μm which, again, is thought to be the result of the break-up of agglomerated particles from the sonicator of the laser particle size analyzer.

TABLE VI

| Parameter/Characteristic | Pretreated α-AOM Precursor Material |
|---|---|
| Ultrasound Time (s) | 30 |
| D10 (μm) | 0.492 |
| D50 (μm) | 2.504 |
| D90 (μm) | 8.03 |
| Mean Diameter (μm) (vol. dist.) | 3.55 |
| Mean Diameter (μm) (number dist.) | 0.245 |
| Mean Diameter (μm) (area dist.) | 1.230 |
| Particle Histogram | FIG. 14 |

Trials 1-4 involved the production of treated α-AOM compositions by adding various amounts of water (i.e., in the form of an atomized spray) to the pre-treated α-AOM material, as set forth in Table VII. After the water was added, the resulting moistened intermediate powder 24 was removed from the tumbler 34.

A small sample from each of the four trial compositions was then mixed with isopropyl alcohol and analyzed in a Microtrac laser particle size analyzer. Particle size data for the sample compositions are presented in Table VII. Particle size histograms of the Trials 1-4 compositions are reproduced in FIGS. 15-18 respectively, and illustrate the gradual progression of the powder from a bi-modal particle size distribution to a uni-modal particle size distribution. Note that the histograms for the compositions produced by the solvent misting processes also display small modal peaks at small particle sizes of about 0.2 μm. Again, it is believed that the appearance of these modal peaks are the result of the break-up of agglomerated particles from the sonicator of the laser particle size analyzer.

TABLE VII

Figure 15:
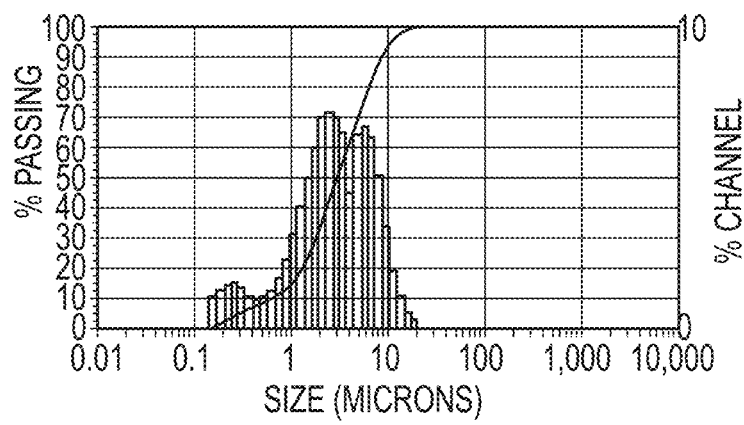
FIGS. 15-18 are particle size histograms and corresponding plots of cumulative undersize distributions of the compositions produced in Trials 1-4 of the solvent misting process.
Figure 16:
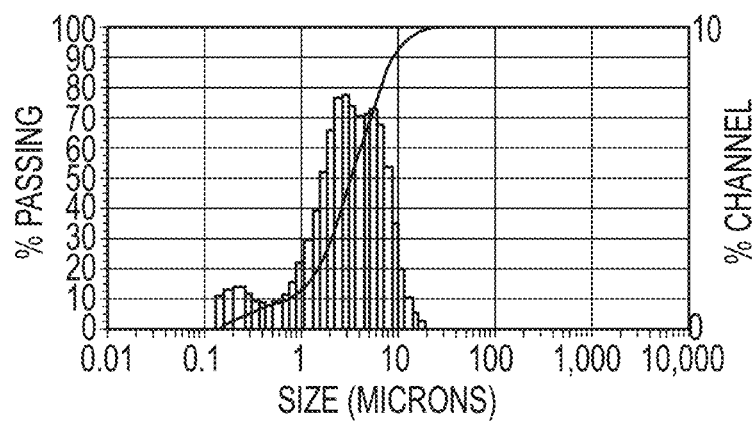
Figure 17:
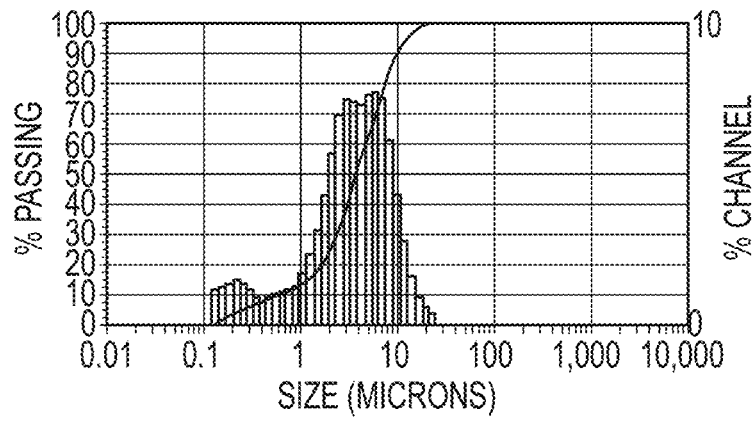
Figure 18:
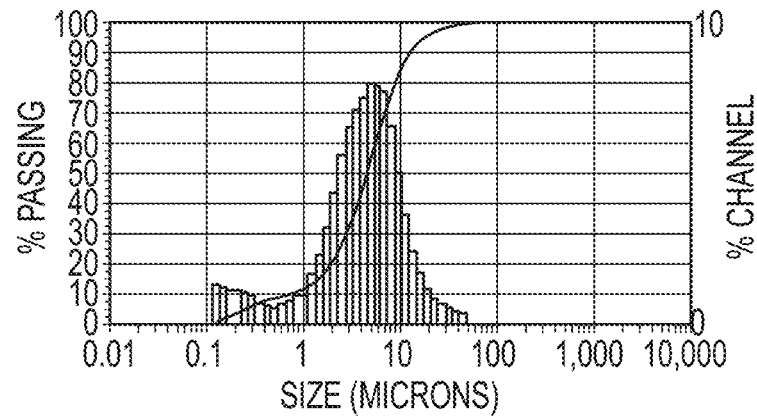

| Parameter/Characteristic | α-AOM Composition | | | |
|---|---|---|---|---|
| | Trial 1 | Trial 2 | Trial 3 | Trial 4 |
| Water (wt. %) | 0.35 | 0.63 | 1.42 | 2.65 |
| Ultrasound Time (s) | 30 | 30 | 30 | 30 |
| D10 (μm) | 0.562 | 0.611 | 0.501 | 0.637 |
| D50 (μm) | 2.886 | 3.23 | 3.63 | 4.41 |
| D90 (μm) | 8.46 | 8.58 | 9.53 | 12.27 |
| Mean Diameter (μm) (vol. dist.) | 3.91 | 4.13 | 4.61 | 6.12 |
| Mean Diameter (μm) (number dist.) | 0.234 | 0.226 | 0.186 | 0.180 |
| Mean Diameter (μm) (area dist.) | 1.335 | 1.410 | 1.311 | 1.447 |
| Particle Histogram | FIG. 15 | FIG. 16 | FIG. 17 | FIG. 18 |

Intermediate Adsorbent Process

Another example involved the process 110 in which the solvent 122 was first applied to the intermediate adsorbent 123. The resulting solvent-laden intermediate adsorbent 123 was then placed into a sealed container 135 along with the AOM precursor material 114. The AOM precursor material 114 again comprised thermally-reduced or "dry" α-AOM powder from the Climax Molybdenum Company, as noted herein. The AOM precursor material 114 had the typical bi-modal particle size distribution described earlier for the other AOM precursor materials. In this example, deionized water was added to about 28 g of silica gel adsorbent 123. The silica gel adsorbent 123 absorbed about 30-35% by weight deionized water, which was consistent with the theoretical values for silica gel at that temperature and 100% humidity. The resulting solvent-laden silica gel intermediate adsorbent 123 (contained in a gas-permeable bag 125) was then placed in a container 135, along with about 100 g of AOM precursor material 114. The container 135 was then sealed (i.e., made substantially air-tight) and maintained at room temperature (i.e., about 22° C.) for approximately 120 hours (about 5 days).

Before proceeding with the description, it should be noted that the amount of silica gel intermediate adsorbent 123 used in this example was far in excess of the amount that would be typically used in a working embodiment. There were two reasons for this: First, to determine if the method would cause the AOM precursor material 114 to produce a paste-like substance through oversaturation; second, to see how much moisture the AOM would adsorb from the silica gel intermediate adsorbent 123 under less than optimal conditions. The AOM precursor material 114 did not become paste-like, even though the silica gel intermediate adsorbent 123 contained far more solvent 122 (i.e., water) than otherwise would be required for the treatment process. Subsequent analysis revealed that the silica gel intermediate adsorbent 123 released about a third (i.e., 33%) of the solvent 122 adsorbed, meaning that the overall treated AOM material 112 contained about 3-4% water on a weight basis. On a large scale basis, the addition of silica gel intermediate adsorbent 123 added in sufficient quantities to add between about 0.3% by weight to about 0.5% by weight water should provide good results.

Figure 21:
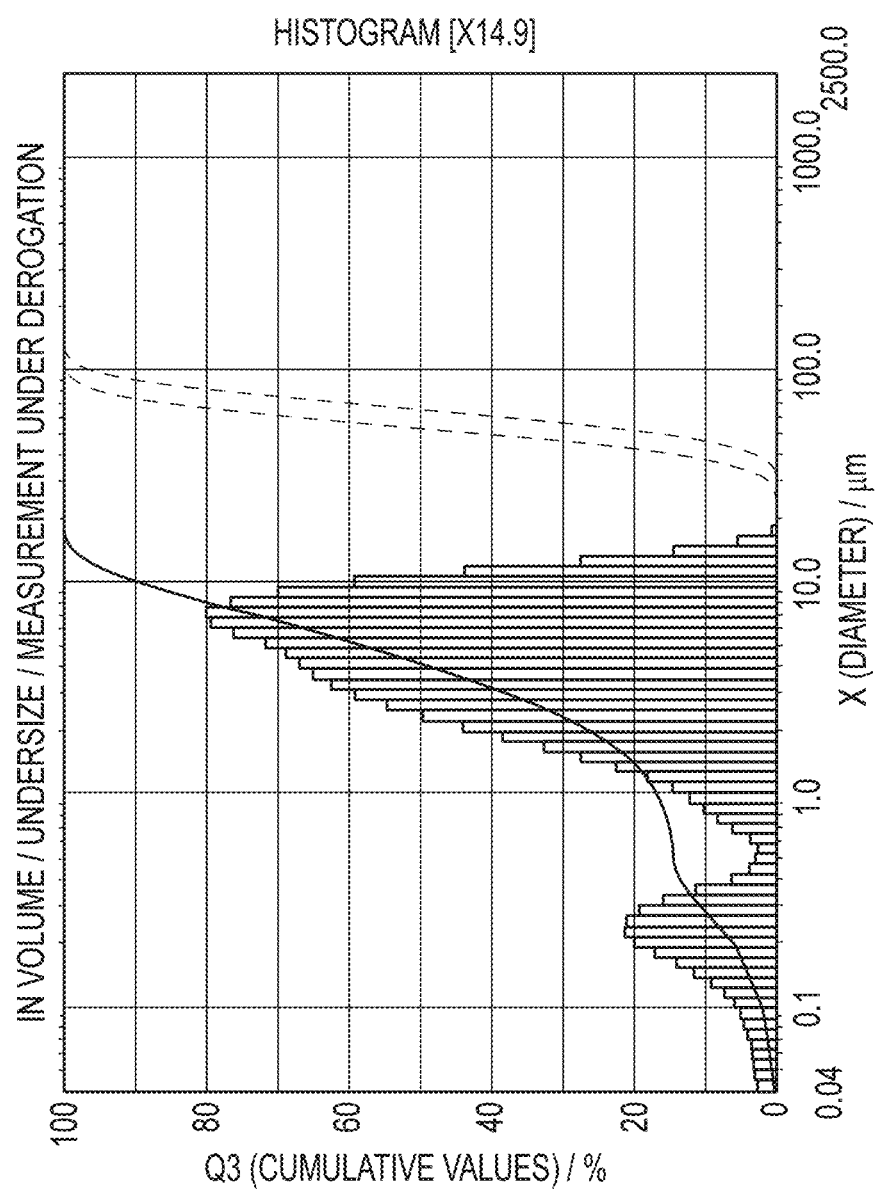
FIG. 21 is a particle size histogram and plot of cumulative undersize distribution of a composition produced by the intermediate adsorbent process illustrated in FIG. 19.

Continuing now with the description, a small sample of the resulting treated AOM material 112 was then mixed with isopropyl alcohol and analyzed in the Cilas particle size analyzer. The resulting particle size histogram is reproduced in FIG. 21. As can be seen from the histogram, the particle size distribution of the treated AOM material 112 is substantially uni-modal, having a modal peak at about 7 μm. Note the appearance of an additional modal peak at a particle size of about 0.2 µm. Here again, it is believed that the appearance of this modal peak is the result of the break-up of agglomerated particles from the sonicator of the laser particle size analyzer.

In conclusion, the claimed product and process collectively represent an important development in molybdenum technology. The treated AOM composition described above is not only characterized by a substantially uni-modal particle size distribution, which is difficult to achieve by conventional methods, but also results in the production of optically-markable ink compositions having superior performance and consistency compared to compositions made from untreated AOM compositions. The treatment methods described herein allow the production of the treated AOM composition in large quantities and with uniform particle size distribution characteristics.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A treatment method, comprising:
   providing an initial supply of an ammonium octamolybdate precursor powder having a bi-modal particle size distribution;
   applying a quantity of solvent to the initial supply of ammonium octamolybdate precursor powder to form a moistened intermediate powder; and
   allowing the moistened intermediate powder to adsorb the applied solvent over a time period, the quantity of solvent applied and the time period being sufficient to form a treated ammonium octamolybdate powder composition having a substantially uni-modal particle size distribution.

2. The method of claim 1, wherein said applying a quantity of solvent comprises applying water to the initial supply of ammonium octamolybdate powder in an amount ranging from about 0.1% by weight to about 1% by weight of the initial supply of ammonium octamolybdate precursor powder.

3. The method of claim 2, further comprising applying water to the initial supply of ammonium octamolybdate precursor powder in an amount of about 0.5% by weight of the initial supply of ammonium octamolybdate precursor powder.

4. The method of claim 2, wherein said applying water comprises:
   atomizing the water to form an atomized stream; and
   directing the atomized stream of water onto the initial supply of ammonium octamolybdate precursor powder.

5. The method of claim 4, further comprising, tumbling the initial supply of ammonium octamolybdate precursor powder while directing the atomized stream of water onto the initial supply of ammonium octamolybdate precursor powder so that substantially all of the initial supply of ammonium octamolybdate precursor powder is exposed to the atomized stream of water.

6. The method of claim 5, further comprising heating while directing the atomized stream of water onto the initial supply of ammonium octamolybdate precursor powder.

7. The method of claim 5, further comprising:
   terminating the atomized stream of water; and
   heating the initial supply of ammonium octamolybdate precursor powder after said terminating.

8. The method of claim 7, further comprising alternately repeating said terminating and said heating steps.

9. The method of claim 1, wherein said providing an initial supply of ammonium octamolybdate precursor powder comprises providing a supply of $\alpha$-ammonium octamolybdate powder formed by thermal decomposition of ammonium dimolybdate.

10. The method of claim 2, wherein said applying water comprises:
    providing a supply of steam; and
    directing a flow of steam onto the initial supply of ammonium octamolybdate precursor powder.

11. The method of claim 10, further comprising heating while directing the flow of steam onto the initial supply of ammonium octamolybdate precursor powder.

12. The method of claim 10, further comprising:
    terminating the flow of steam; and
    heating the initial supply of ammonium octamolybdate precursor powder after said terminating.

13. The method of claim 12, further comprising alternately repeating said terminating and said heating steps until the treated ammonium octamolybdate powder composition acquires the uni-modal particle size distribution.

14. The method of claim 1, wherein said treated ammonium octamolybdate powder composition comprises an anhydrous loss on ignition value ranging from about 8 to about 8.8 percent.

15. The method of claim 1, wherein the treated ammonium octamolybdate powder composition has a modal diameter in a range of about 4 µm to about 12 µm.

16. The method of claim 1, wherein the treated ammonium octamolybdate powder composition has a modal diameter in a range of about 5 µm to about 7 µm.

17. The method of claim 1, wherein the treated ammonium octamolybdate powder composition has a modal diameter of about 6 µm.

18. The method of claim 1, wherein the treated ammonium octamolybdate powder composition has a modal diameter of about 10 µm.

19. The method of claim 1, wherein applying a quantity of solvent comprises:
    providing an intermediate adsorbent;
    applying a quantity of solvent to the intermediate adsorbent to produce a solvent-laden intermediate adsorbent;
    placing the solvent-laden intermediate adsorbent and the initial supply of ammonium octamolybdate precursor powder into a container; and
    sealing the container; and
   wherein said allowing comprises:
    allowing the initial supply of ammonium octamolybdate precursor powder to adsorb solvent desorbed from the intermediate adsorbent over a time period, the quantity of solvent desorbed and the time period being sufficient to form a treated ammonium octamolybdate powder composition having a substantially uni-modal particle size distribution.

20. A method of producing a treated ammonium octamolybdate powder composition, comprising:
    providing an initial supply of $\alpha$-ammonium octamolybdate precursor powder, the initial supply of $\alpha$-ammonium octamolybdate precursor powder having a bi-modal particle size distribution with a first modal peak ranging from about 1 µm to about 4 µm and a second modal peak ranging from about 6 µm to about 10 µm;
    applying a quantity of solvent to the initial supply of $\alpha$-ammonium octamolybdate powder;
    allowing the initial supply of $\alpha$-ammonium octamolybdate powder to adsorb the applied solvent over a time period, the quantity of solvent applied and the time period being sufficient to form the treated ammonium octamolybdate powder composition, the treated ammonium octamolybdate powder composition having a uni-modal particle size distribution with a modal peak ranging from about 6 μm to about 10 μm.

21. A treated ammonium octamolybdate powder composition made by adding an amount of water to an initial supply of ammonium octamolybdate precursor powder having a bi-modal particle size distribution and by allowing the initial supply of ammonium octamolybdate powder to adsorb the added water over a time period, the amount of water added and time period being sufficient to produce the treated ammonium octamolybdate powder composition, the treated ammonium octamolybdate powder composition having a uni-modal particle size distribution.

22. The treated ammonium octamolybdate powder composition of claim 20, comprising a modal peak ranging from about 4 μm to about 12 μm.

23. An improved optically-markable ink composition of the type comprising an oxyanion of a multivalent metal, a solvent, and a binder, wherein the improvement comprises using as the oxyanion of a multivalent metal an ammonium octamolybdate powder having a substantially uni-modal particle size distribution made by applying an amount of solvent to an initial supply of ammonium octamolybdate precursor powder to form a moistened intermediate powder and allowing the moistened intermediate powder to adsorb the applied solvent over a time period, the amount of solvent applied and time period being sufficient to form the treated ammonium octamolybdate powder composition having the substantially uni-modal particle size distribution.

24. A treatment method, comprising:
providing an initial supply of an ammonium octamolybdate precursor powder having a bi-modal particle size distribution;
providing an intermediate adsorbent;
applying a quantity of solvent to the intermediate adsorbent to produce a solvent-laden intermediate adsorbent;
placing the solvent-laden intermediate adsorbent and the initial supply of ammonium octamolybdate precursor powder into a container;
sealing the container; and
allowing the initial supply of ammonium octamolybdate precursor powder to adsorb solvent desorbed from the intermediate adsorbent over a time period, the quantity of solvent and the time period being sufficient to form a treated ammonium octamolybdate powder composition having a substantially uni-modal particle size distribution.

25. A treatment method, comprising:
providing an initial supply of an ammonium octamolybdate precursor powder having a bi-modal particle size distribution and having retained moisture of at least about 0.1 wt. %, as determined by loss-on-drying;
placing the initial supply of ammonium octamolybdate precursor powder into a container;
sealing the container; and
heating the sealed container at a temperature of at least about 30° C. for a time period sufficient to form a treated ammonium octamolybdate powder composition having a substantially uni-modal particle size distribution.

* * * * *